(12) United States Patent
Heo et al.

(10) Patent No.: US 11,706,405 B2
(45) Date of Patent: Jul. 18, 2023

(54) IMAGE/VIDEO CODING METHOD BASED ON INTRA PREDICTION INVOLVING PARSING OF MPM INDEX, AND APPARATUS THEREOF

(71) Applicant: LG Electronics Inc., Seoul (KR)

(72) Inventors: Jin Heo, Seoul (KR); Sunmi Yoo, Seoul (KR); Ling Li, Seoul (KR); Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/982,411

(22) PCT Filed: Mar. 27, 2019

(86) PCT No.: PCT/KR2019/003534
§ 371 (c)(1),
(2) Date: Sep. 18, 2020

(87) PCT Pub. No.: WO2019/190181
PCT Pub. Date: Oct. 3, 2019

(65) Prior Publication Data
US 2021/0076028 A1 Mar. 11, 2021

Related U.S. Application Data

(60) Provisional application No. 62/655,773, filed on Apr. 10, 2018.

(30) Foreign Application Priority Data

Mar. 30, 2018 (KR) ........................ 10-2018-0037749

(51) Int. Cl.
*H04N 19/105* (2014.01)
*H04N 19/159* (2014.01)
(Continued)

(52) U.S. Cl.
CPC ........... *H04N 19/105* (2014.11); *H04N 19/11* (2014.11); *H04N 19/119* (2014.11);
(Continued)

(58) Field of Classification Search
CPC .. H04N 19/105; H04N 19/119; H04N 19/159; H04N 19/176; H04N 19/186;
(Continued)

(56) References Cited

U.S. PATENT DOCUMENTS

2013/0272405 A1* 10/2013 Jeon ..................... H04N 19/80
375/240.15
2017/0026652 A1 1/2017 Choi et al.
(Continued)

FOREIGN PATENT DOCUMENTS

EP 3422716 A1 * 1/2019 ............. H04N 19/70
KR 20160009109 1/2016
(Continued)

OTHER PUBLICATIONS

Brass et al., "Versatile Video Coding (Draft 4)," JVET-M1001-v6, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 295 pages.
(Continued)

*Primary Examiner* — Francis Geroleo
(74) *Attorney, Agent, or Firm* — Fish & Richardson P.C.

(57) ABSTRACT

Disclosed is an image decoding method which includes obtaining, from a bitstream, information relating to the intra prediction type of a current block, information relating to the intra prediction mode of the current block, and residual information of the current block; performing intra prediction based on of the information relating to the intra prediction type and the information relating to the intra prediction mode; performing residual processing based on of the residual information; and reconstructing the current block based on of a result of the intra prediction and a result of the residual processing.

16 Claims, 24 Drawing Sheets

(51) Int. Cl.
    *H04N 19/176* (2014.01)
    *H04N 19/186* (2014.01)
    *H04N 19/46* (2014.01)
    *H04N 19/11* (2014.01)
    *H04N 19/119* (2014.01)
    *H04N 19/593* (2014.01)
    *H04N 19/70* (2014.01)

(52) U.S. Cl.
    CPC ......... *H04N 19/159* (2014.11); *H04N 19/176* (2014.11); *H04N 19/186* (2014.11); *H04N 19/46* (2014.11); *H04N 19/593* (2014.11); *H04N 19/70* (2014.11)

(58) Field of Classification Search
    CPC ...... H04N 19/44; H04N 19/46; H04N 19/625; H04N 19/70; H04N 19/593
    See application file for complete search history.

(56) References Cited

U.S. PATENT DOCUMENTS

| | | | | |
|---|---|---|---|---|
| 2018/0234679 A1* | 8/2018 | Heo | | H04N 19/105 |
| 2018/0332284 A1* | 11/2018 | Liu | | H04N 19/70 |
| 2019/0208195 A1* | 7/2019 | Chang | | H04N 19/11 |
| 2019/0222837 A1* | 7/2019 | Lee | | H04N 19/44 |
| 2019/0306494 A1* | 10/2019 | Chang | | H04N 19/159 |
| 2019/0327466 A1* | 10/2019 | Ikai | | H04N 19/157 |
| 2020/0120336 A1* | 4/2020 | Racape | | H04N 19/70 |
| 2020/0169752 A1* | 5/2020 | Rath | | H04N 19/11 |
| 2020/0195920 A1* | 6/2020 | Racape | | H04N 19/70 |
| 2020/0252608 A1* | 8/2020 | Ramasubramonian | | H04N 19/176 |
| 2021/0368205 A1* | 11/2021 | Chen | | H04N 19/105 |
| 2022/0021871 A1* | 1/2022 | Racape | | H04N 19/182 |

FOREIGN PATENT DOCUMENTS

| | | |
|---|---|---|
| KR | 101737607 | 5/2017 |
| KR | 20180014109 | 2/2018 |
| KR | 20180015598 | 2/2018 |
| KR | 20200063092 | 6/2020 |
| KR | 20200106982 | 9/2020 |
| WO | WO2017188565 | 11/2017 |

OTHER PUBLICATIONS

Office Action in Korean Appln. No. 10-2020-7025164, dated Jan. 5, 2022, 18 pages (with English translation).

Notice of Allowance in Korean Appln. No. 10-2020-7025164, dated Sep. 15, 2022, 6 pages (with English translation).

* cited by examiner (a)

(b)

IMAGE/VIDEO CODING METHOD BASED ON INTRA PREDICTION INVOLVING PARSING OF MPM INDEX, AND APPARATUS THEREOF

CROSS-REFERENCE TO RELATED APPLICATIONS

This application is a National Stage application under 35 U.S.C. § 371 of International Application No. PCT/KR2019/003534, filed on Mar. 27, 2019, which claims the benefit of Korean Patent Application No. 10-2018-0037749, filed on Mar. 30, 2018, and U.S. Provisional Application No. 62/655,773, filed on Apr. 10, 2018, the contents of which are all hereby incorporated by reference herein in their entirety.

BACKGROUND OF THE DISCLOSURE

Field of the Disclosure

The present disclosure relates to an image coding technology, and more specifically, to an image/video coding method and apparatus based on intra prediction.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

An object of the present disclosure is to provide a method and an apparatus for enhancing image coding efficiency.

Another object of the present disclosure is to provide an efficient intra prediction method and apparatus.

Still another object of the present disclosure is to provide a method and an apparatus for efficiently signaling an intra prediction mode.

Yet another object of the present disclosure is to provide a method and an apparatus for adaptively deriving an intra prediction mode according to an intra prediction type.

An exemplary embodiment of the present disclosure provides an image decoding method performed by a decoding apparatus. The method includes: acquiring information about an intra prediction type of a current block from a bitstream, deriving the intra prediction type of the current block based on the information about the intra prediction type, acquiring information about an intra prediction mode of the current block from the bitstream, configuring a most probable mode (MPM) list including candidate intra prediction modes of the current block based on neighboring blocks of the current block, deriving the intra prediction mode of the current block based on the MPM list and the information about the intra prediction mode, generating a predicted block of the current block based on the intra prediction type and the intra prediction mode, acquiring residual information from the bitstream, generating a residual block based on the residual information, and generating a reconstructed block configuring a reconstructed picture based on the predicted block and the residual block, in which if the intra prediction type represents a specific intra prediction type, the information about the intra prediction mode includes: an MPM index, and if the intra prediction type represents the specific intra prediction type, the MPM index is parsed without parsing an MPM flag from the bitstream.

Another exemplary embodiment of the present disclosure provides a decoding apparatus for performing an image decoding. The decoding apparatus includes: an entropy decoder for acquiring information about an intra prediction type, information about an inter prediction mode, and residual information of a current block from a bitstream, a predictor for deriving the intra prediction type of the current block based on the information about the intra prediction type, configuring a most probable mode (MPM) list including candidate intra prediction modes of the current block based on neighboring blocks of the current block, deriving an intra prediction mode of the current block based on the MPM list and the information about the intra prediction mode, and generating a predicted block of the current block based on the intra prediction type and the intra prediction mode, and a residual processor for generating a residual block based on the residual information, in which if the intra prediction type represents a specific intra prediction type, the information about the intra prediction mode includes: an MPM index, and if the intra prediction type represents the specific intra prediction type, the MPM index is parsed without parsing an MPM flag from the bitstream.

Still another exemplary embodiment of the present disclosure provides an image encoding method performed by an encoding apparatus. The method includes: determining an intra prediction type of a current block, generating information about the intra prediction type of the current block, configuring a most probable mode (MPM) list including candidate intra prediction modes of the current block based on neighboring blocks of the current block, deriving an intra prediction mode of the current block based on the MPM list, generating a predicted block of the current block based on the intra prediction type and the intra prediction mode, generating predicted information of the current block, the predicted information including the information about the intra prediction type and the information about the intra prediction mode, deriving a residual block based on the predicted block, generating residual information based on the residual block, and outputting a bitstream by encoding image information including the predicted information and the residual information, in which the information about the intra prediction mode is generated based on the intra prediction type, if the intra prediction type represents a specific intra prediction type, the information about the intra prediction mode includes: an MPM index, and the intra prediction mode of the current block is limited to one of candidate intra prediction modes within the MPM list.

Yet exemplary embodiment of the present disclosure provides an image encoding apparatus for performing an image encoding. The image encoding apparatus includes: a predictor for determining an intra prediction type of a current block, generating information about the intra prediction type of the current block, configuring a most probable mode (MPM) list including candidate intra prediction modes of the current block based on neighboring blocks of the current block, deriving an intra prediction mode of the current block based on the MPM list, generating a predicted block of the current block based on the intra prediction type and the intra prediction mode, and generating prediction information of the current block, the prediction information including the information about the intra prediction type and the information about the intra prediction mode, a residual processor for deriving a residual block based on the predicted block, and generating residual information based on the residual block, and an entropy encoder for outputting a bitstream by encoding image information including the prediction information and the residual information, in which the predictor generates the information about the intra prediction mode based on the intra prediction type, if the intra prediction type represents a specific intra prediction type, the information about the intra prediction mode includes: an MPM index, and the intra prediction mode of the current block is limited to one of the candidate intra prediction modes within the MPM list.

The present disclosure may enhance the overall image/video compression efficiency.

The present disclosure may decrease the amount of data to be transmitted necessary for the residual processing through the efficient prediction.

The present disclosure may decrease the computational complexity and efficiently derive the intra prediction mode.

The present disclosure may decrease the amount of data necessary for signaling the intra prediction mode.

DESCRIPTION OF EXEMPLARY EMBODIMENTS

Figure 1:
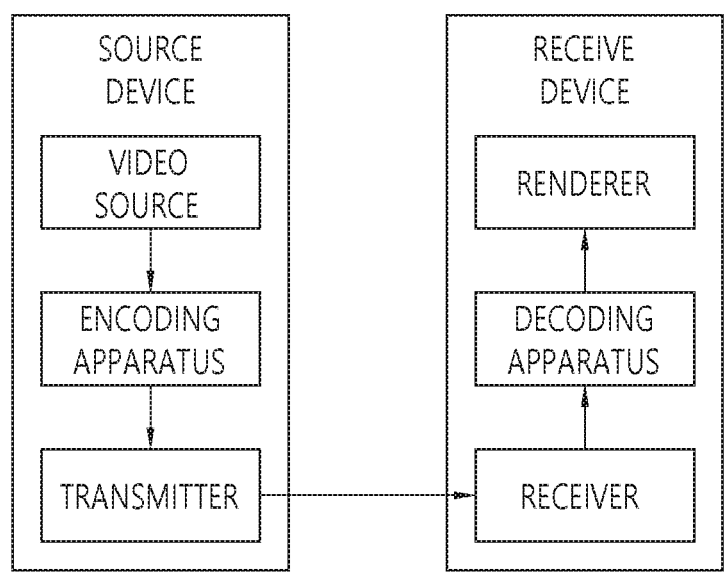
FIG. 1 schematically illustrates an example of a video/image coding system to which the present disclosure is applicable.

An exemplary embodiment of the present disclosure provides an image information decoding method performed by a decoding apparatus. The method includes: decoding a non-separable secondary transform (NSST) index from a bitstream, if an NSST is applied to a target block, decoding information about transform coefficients for the target block from the bitstream, based on the decoded NSST index, and deriving the transform coefficients for the target block based on the decoded information about the transform coefficients, in which the NSST index is decoded prior to the information about the transform coefficients for the target block.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Hereinafter, examples of the present embodiment will be described in detail with reference to the accompanying drawings. In addition, like reference numerals are used to indicate like elements throughout the drawings, and the same descriptions on the like elements will be omitted.

This document relates to video/image coding. For example, the methods/embodiments disclosed in this document may be applied to a method which is disclosed in a versatile video coding (VVC) standard, or a next generation video/image coding standard.

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

FIG. 1 illustrates an example of a video/image coding system to which the present disclosure may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smart phones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
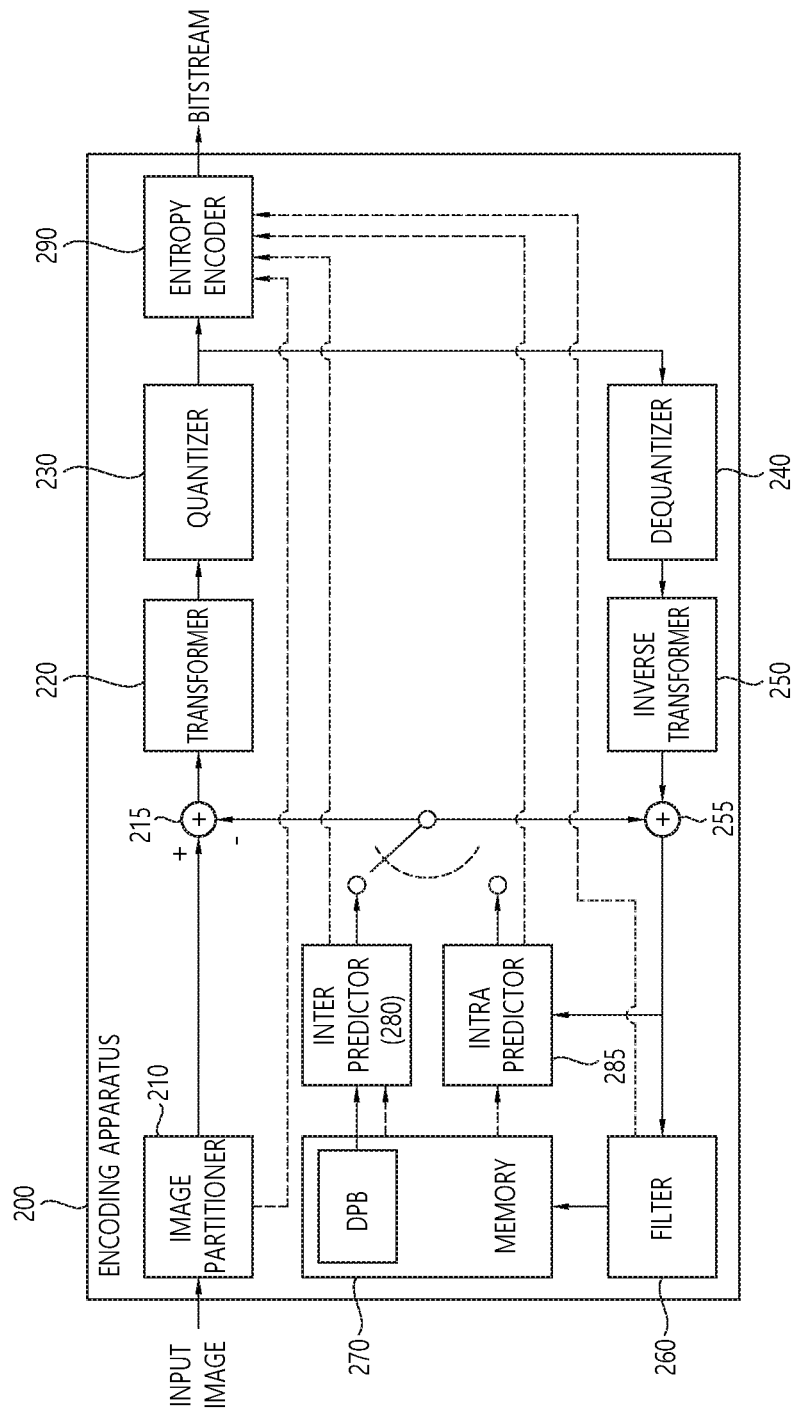
FIG. 2 is a diagram for schematically explaining a configuration of a video/image encoding apparatus to which the present disclosure is applicable.

FIG. 2 schematically illustrates a configuration of a video/image encoding apparatus to which the present disclosure is applicable. Hereinafter, a video encoding apparatus may include an image encoding apparatus.

Referring to FIG. 2, an encoding apparatus 200 may be configured to include an image partitioner 210, a subtractor 215, a transformer 220, a quantizer 230, a dequantizer 240, an inverse transformer 250, an adder 255, a filter 260, a memory 270, an inter predictor 280, an intra predictor 285, and an entropy encoder 290. The inter predictor 280 and the intra predictor 285 may be collectively called a predictor. That is, the predictor may include the inter predictor 280 and the intra predictor 285. The transformer 220, the quantizer 230, the dequantizer 240, and the inverse transformer 250 may be included in a residual processor. The residual processor may further include the subtractor 215. The aforementioned image partitioner 210, subtractor 215, transformer 220, quantizer 230, dequantizer 240, inverse transformer 250, adder 255, filter 260, inter predictor 280, intra predictor 285, and entropy encoder 290 may be configured by one hardware component (e.g., an encoder chipset or a processor) according to an exemplary embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 280 or the intra predictor 285 from the input image signal (original block, original sample array), and the generated residual signal is transmitted to the transformer 220. In this case, as illustrated, the unit for subtracting the predicted signal (predicted block, prediction sample array) from the input image signal (original block, original sample array) within an encoder 200 may be called the subtractor 215. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 290 as described later in the description of each prediction mode. The information about prediction may be encoded by the entropy encoder 290 to be output in a form of the bitstream.

The intra predictor 285 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 285 may also determine the prediction mode applied to the current block using the prediction mode applied to the neighboring block.

The inter predictor 280 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 280 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 280 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). In addition, the predictor may also perform an intra block copy (IBC) for predicting the block. The intra block copy may be used to code content image/video of a game or the like such as a screen content coding (SCC), for example. The IBC basically performs prediction within the current picture but may be performed similar to the inter prediction in that the reference block is derived within the current picture. That is, the IBC may use at least one of the inter prediction techniques described in this document.

The predicted signal generated through the predictor (including the inter predictor 280 and/or the intra predictor 285) may be used to generate a reconstructed signal or used to generate a residual signal. The transformer 220 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 230 may quantize the transform coefficients to transmit the quantized transform coefficients to the entropy encoder 290, and the entropy encoder 290 may encode the quantized signal (information about the quantized transform coefficients) to the encoded quantized signal to the bitstream. The information about the quantized transform coefficients may be called residual information. The quantizer 230 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 290 may perform various encoding methods, for example, such as an exponential Golomb coding, a context-adaptive variable length coding (CAVLC), and a context-adaptive binary arithmetic coding (CABAC). The entropy encoder 290 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 290 and/or a storage (not illustrated) for storing the signal may be configured as the internal/external elements of the encoding apparatus 200, or the transmitter may also be included in the entropy encoder 290.

The quantized transform coefficients output from the quantizer 230 may be used to generate a predicted signal. For example, the dequantizer 240 and the inverse transformer 250 apply dequantization and inverse transform to the quantized transform coefficients, such that the residual signal (residual block or residual samples) may be reconstructed. The adder 255 adds the reconstructed residual signal to the predicted signal output from the inter predictor 280 or the intra predictor 285, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 255 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 290, as described later in the description of each filtering method. The filtering-related information may be encoded by the entropy encoder 290 to be output in a form of the bitstream.

The modified reconstructed picture transmitted to the memory 270 may be used as the reference picture in the inter predictor 280. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 280. The memory 270 may store motion information of the block in which the motion information within the current picture is derived (or encoded) and/or motion information of the blocks within the previously reconstructed picture. The stored motion information may be transferred to the inter predictor 280 to be utilized as motion information of the spatial neighboring block or motion information of the temporal neighboring block. The memory 270 may store the reconstructed samples of the reconstructed blocks within the current picture, and transfer the reconstructed samples to the intra predictor 285.

Figure 3:
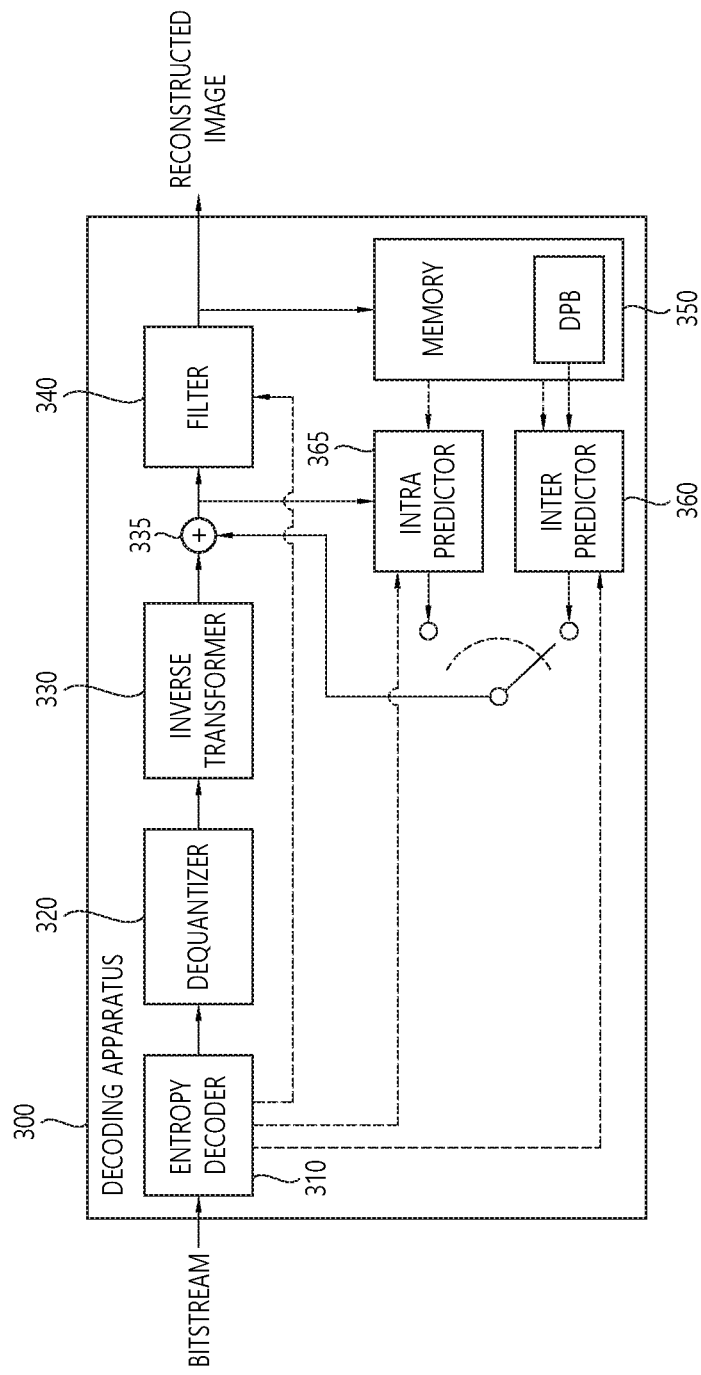
FIG. 3 is a diagram for schematically explaining a configuration of a video/image decoding apparatus to which the present disclosure is applicable.

FIG. 3 is a diagram for schematically explaining a configuration of a video/image decoding apparatus to which the present disclosure is applicable.

Referring to FIG. 3, a decoding apparatus 300 may be configured to include an entropy decoder 310, a dequantizer 320, an inverse transformer 330, an adder 335, a filter 340, a memory 350, an inter predictor 360, and an intra predictor 365. The inter predictor 360 and the intra predictor 365 may be collectively called a predictor. That is, the predictor may include the inter predictor 360 and the intra predictor 365. The dequantizer 320 and the inverse transformer 330 may be collectively called a residual processor. That is, the residual processor may include the dequantizer 320 and the inverse transformer 330. The aforementioned entropy decoder 310, dequantizer 320, inverse transformer 330, adder 335, filter 340, inter predictor 360, and intra predictor 365 may be configured by one hardware component (e.g., a decoder chipset or a processor) according to the exemplary embodiment. In addition, the memory 350 may include the decoded picture buffer (DPB), and may also be configured by a digital storage medium. The hardware component may further include the memory 350 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 360 and the intra predictor 365), and a residual value at which the entropy decoding is performed by the entropy decoder 310, that is, the quantized transform coefficients and the related parameter information may be input to the dequantizer 320. In addition, the information about filtering among the information decoded by the entropy decoder 310 may be provided to the filter 340. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 320, the inverse transformer 330, the adder 335, the filter 340, the memory 350, the inter predictor 360, and the intra predictor 365.

The dequantizer 320 may dequantize the quantized transform coefficients to output the transform coefficients. The dequantizer 320 may rearrange the quantized transform coefficients in a two-dimensional block form. In this case, the rearrangement may be performed based on a coefficient scan order performed by the encoding apparatus. The dequantizer 320 may perform dequantization for the quantized transform coefficients using a quantization parameter (e.g., quantization step size information), and acquire the transform coefficients.

The inverse transformer 330 inversely transforms the transform coefficients to acquire the residual signal (residual block, residual sample array).

The predictor may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). In addition, the predictor may also perform an intra block copy (IBC) for the prediction of the block. The intra block copy may be used for the content image/video coding of a game or the like, such as a screen content coding (SCC). The IBC may basically perform the prediction within the current picture but be performed similar to the inter prediction in that the reference block is derived within the current picture. That is, the IBC may use at least one of the inter prediction techniques described in this document.

The intra predictor 365 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 365 may also determine the prediction mode applied to the current block using the prediction mode applied to the neighboring block.

The inter predictor 360 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 360 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 335 may add the acquired residual signal to the predicted signal (predicted block, prediction sample array) output from the predictor (including the inter predictor 360 and/or the intra predictor 365) to generate the reconstructed signal (reconstructed picture, reconstructed block, reconstructed sample array). As in the case where the skip mode is applied, if there is no residual for the block to be processed, the predicted block may be used as the reconstructed block.

The adder 335 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 340 may apply filtering to the reconstructed signal, thereby improving the subjective/objective image qualities. For example, the filter 340 may apply various filtering methods to the reconstructed picture to generate a modified reconstructed picture, and transmit the modified reconstructed picture to the memory 350, specifically, the DPB of the memory 350. Various filtering methods may include, for example, a deblocking filtering, a sample adaptive offset, an adaptive loop filter, a bidirectional filter, and the like.

The (modified) reconstructed picture stored in the DPB of the memory 350 may be used as the reference picture in the inter predictor 360. The memory 350 may store motion information of the block in which the motion information within the current picture is derived (decoded) and/or motion information of the blocks within the previously reconstructed picture. The stored motion information may be transferred to the inter predictor 360 to be utilized as motion information of the spatial neighboring block or motion information of the temporal neighboring block. The memory 350 may store the reconstructed samples of the reconstructed blocks within the current picture, and transfer the stored reconstructed samples to the intra predictor 365.

In the present specification, the exemplary embodiments described in the filter 260, the inter predictor 280, and the intra predictor 285 of the encoding apparatus 200 may be applied equally to or to correspond to the filter 340, the inter predictor 360, and the intra predictor 365 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Meanwhile, if the intra prediction is applied to the current block, as described above, the encoding apparatus/decoding apparatus may derive the intra prediction mode of the current block, and derive the predicted block including prediction samples of the current block based on the intra prediction mode. That is, the encoding apparatus/decoding apparatus may derive the prediction samples of the current block by applying the intra prediction mode (e.g., directional mode or non-directional mode) based on neighboring reference samples of the current block.

Figure 4:
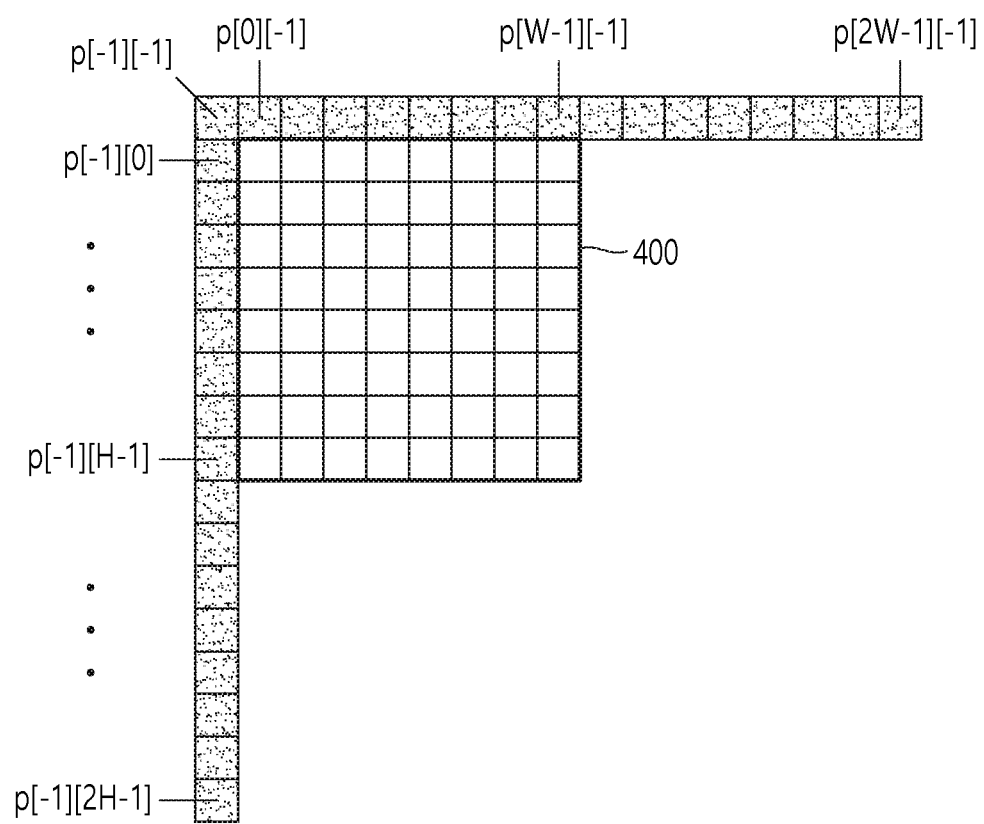
FIG. 4 illustrates an example of neighboring reference samples which may be used for a case where intra prediction is performed.

FIG. 4 illustrates an example of the neighboring reference samples which may be used in performing the intra prediction.

Referring to FIG. 4, as neighboring (reference) samples for the intra prediction of a current block 400, left neighboring samples p[−1][2H−1] . . . p[−1][0], top left neighboring samples p[−1][−1], and top neighboring samples p[0][−1] . . . p[2 W−1][−1] may be derived. Here, p[m][n] represents a sample (or pixel) of a sample position (m, n), which may represent a relative sample position, when considering the top left sample position of the current block as (0, 0). In addition, here, W and H represent the width and height of the current block 400, respectively. The current block 400 may correspond to a coding unit (coding block) or a transform unit (transform block).

Meanwhile, if there is a sample not available for the intra prediction among the neighboring samples p[−1][2H−1] . . . p[−1][−1] . . . p[2 W−1][−1], the corresponding non-available sample may be filled with an available sample through a substitution or padding procedure. In this case, for example, the non-available sample may be substituted or padded with another neighboring sample adjacent to the corresponding sample.

Here, as an example, if the corresponding sample is located outside the picture, the corresponding sample may be a non-available sample. For example, if the current block 400 is located on the edge of the picture, some of the neighboring samples may be not available. As another example, if another CU including the corresponding sample is not coded yet, the corresponding sample may be a non-available sample.

The substitution or padding procedure may be performed in the following order, for example.

1) If the neighboring samples p[−1][2H−1] are not available, search is performed sequentially from the neighboring samples p[−1][2H−1] (or the neighboring samples p[−1][2H−2] to p[−1][1]) to p[−1][−1], and then sequentially from p[0][−1] to p[2 W−1][−1], and a value of the available neighboring sample first found may be assigned to the neighboring sample p[−1][2H−1].

2) Search is performed sequentially from x=−1, y=2H−2 to x=−1, y=−1, and if p[x][y] is not available, the value of the non-available p[x][y] may be substituted with a value of p[x][y+1].

3) Search is performed sequentially from x=0, y=−1 to x=2 W−1, y=−1, and if p[x][y] is not available, the value of the non-available p[x][y] may be substituted with a value of p[x−1][y].

If the intra prediction is applied, a prediction sample is derived using at least one neighboring sample according to an intra prediction mode based on a current block.

In this case, as an example, the intra prediction modes may include two non-directional (or non-angular) intra prediction modes and 33 directional (or angular) intra prediction modes as follows.

TABLE 1

| Intra-prediction mode | Associated name |
|---|---|
| 0 | Intra planar |
| 1 | Intra DC |
| 2 . . . 34 | Intra angular 2 . . . intra angular 34 |

Here, a 0th intra prediction mode represents an intra planar mode, and a first intra prediction mode represents an intra DC mode. Second to 34th intra prediction modes represent an intra angular 2 mode . . . an intra angular 34 mode, respectively.

Here, the intra planar mode and the intra DC mode are non-directional prediction modes, and the intra angular 2 mode to the intra angular 34 mode are directional prediction modes.

Figure 5:
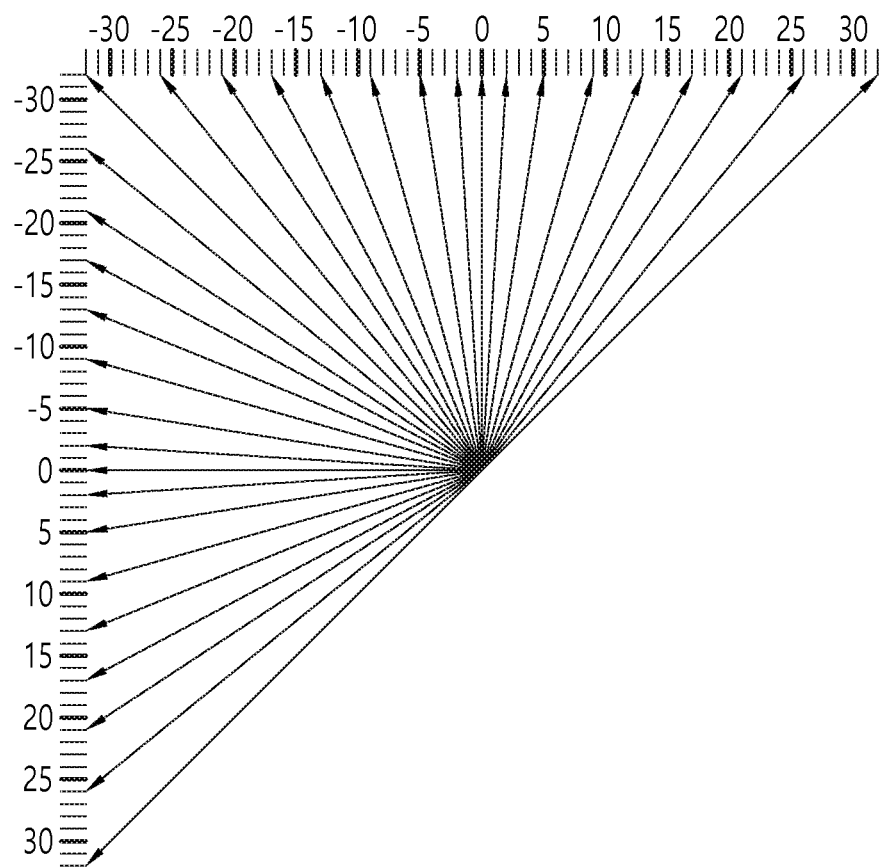
FIGS. 5 and 6 exemplarily illustrate intra prediction modes including 33 directional prediction modes and 2 non-directional prediction modes.
Figure 6:
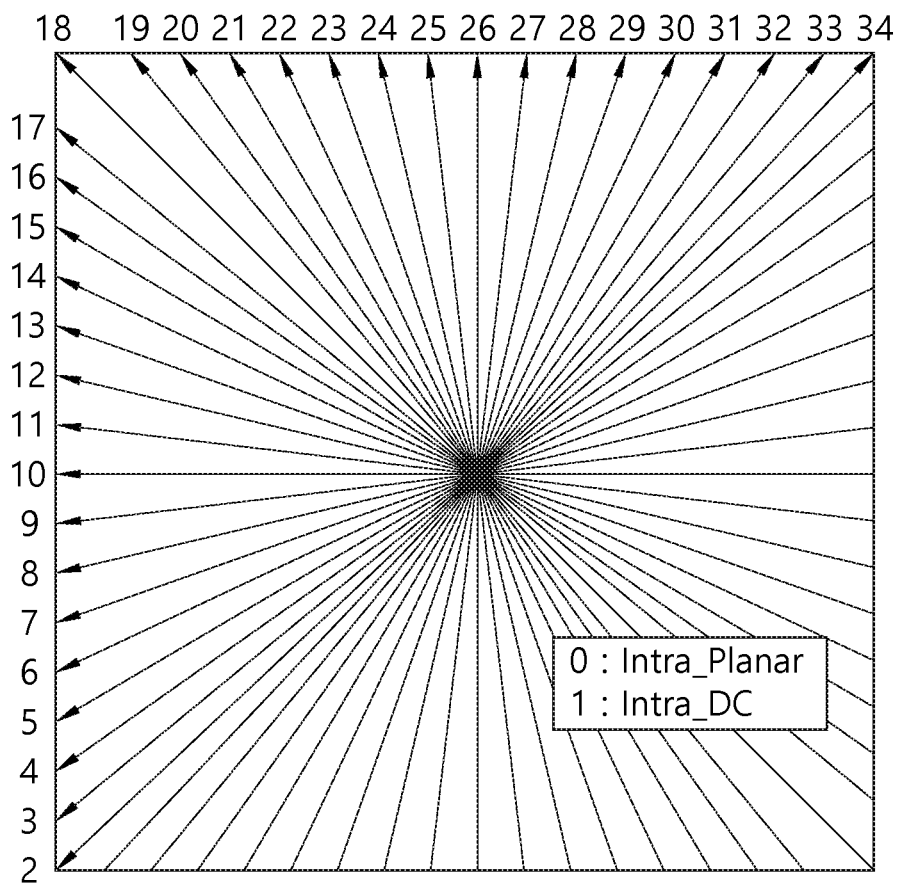

FIGS. 5 and 6 exemplarily illustrate intra prediction modes including 33 directional prediction modes and two non-directional prediction modes.

Referring to FIGS. 5 and 6, an intra prediction mode having horizontal directionality and an intra prediction mode having vertical directionality may be classified with respect to a 18th intra prediction mode having a top left diagonal prediction direction. The numbers of −32 to 32 in FIG. 4 represent the vertical or horizontal displacement of a unit of 1/32 on a sample grid position. Second to 17th intra prediction modes have horizontal directionality, and 18th to 34th intra prediction modes have vertical directionality. 10th intra prediction mode and 26th intra prediction mode represent a horizontal intra prediction mode and a vertical intra prediction mode, respectively and may express the prediction direction of the angular intra mode with respect to the 10th intra prediction mode and the 26th intra prediction mode as an angle. That is, a relative angle corresponding to each of the intra prediction modes may be expressed with respect to a horizontal reference angle 0° corresponding to the 10th intra prediction mode, and a relative angle corresponding to each of the intra prediction modes may be expressed with respect to a vertical reference angle 0° corresponding to the 26th intra prediction mode.

As another example, the intra prediction modes may include two non-directional (or non-angular) intra prediction modes and 65 directional (or angular) intra prediction modes as follows. The non-directional intra prediction modes may include a planar intra prediction mode which is a 0th non-directional intra prediction mode, and a DC intra prediction mode which is a first non-directional intra prediction mode, and the directional intra prediction modes may include 65 intra prediction modes which are second to 66th directional intra prediction modes. However, this is illustrative and the present disclosure may also be applied to a case where the number of intra prediction modes is different.

TABLE 2

| Intra-prediction mode | Associated name |
|---|---|
| 0 | Intra planar |
| 1 | Intra DC |
| 2 . . . 66 | Intra angular 2 . . . intra angular 66 |

Figure 7:
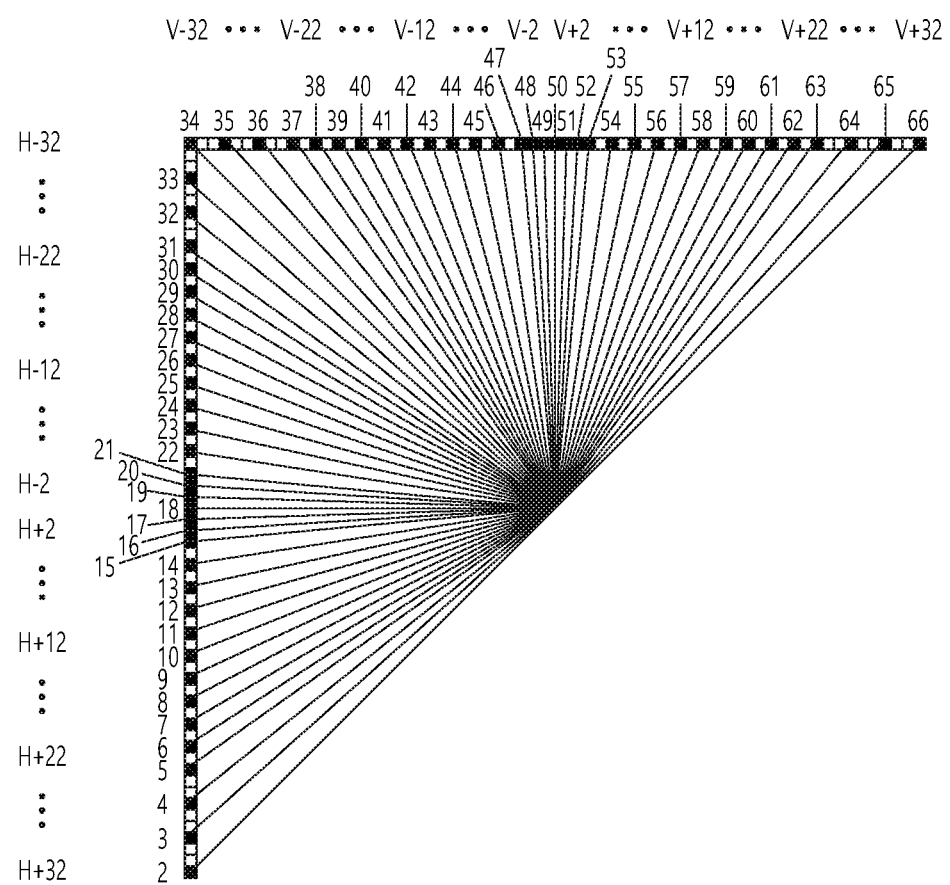
FIG. 7 exemplarily illustrates 65 intra directional modes of prediction directions FIG. 8 exemplarily illustrates LIP.

FIG. 7 exemplarily illustrates intra directional modes of 65 prediction directions.

Referring to FIG. 7, an intra prediction mode having horizontal directionality and an intra prediction mode having vertical directionality may be classified with respect to a 34th intra prediction mode having a top left diagonal prediction direction. In FIG. 3 H and V mean horizontal directionality and vertical directionality, respectively, and the numbers of −32 to 32 represent the displacement of a unit of 1/32 on the sample grid position. Second to 33th intra prediction modes have horizontal directionality, and 34th to 66th intra prediction modes have vertical directionality. 18th intra prediction mode and 50th intra prediction mode represent a horizontal intra prediction mode and a vertical intra prediction mode, respectively, and the second intra prediction mode may be called a bottom left diagonal intra prediction mode, the 34th intra prediction mode may be called a top left diagonal intra prediction mode, and the 66th intra prediction mode may be called a top right diagonal intra prediction mode.

Meanwhile, if the intra prediction is applied to the current block, an intra prediction mode applied to the current block may be derived based on the intra prediction mode of the neighboring block of the current block. For example, the decoding apparatus may derive a most probable mode (MPM) list based on the intra prediction mode of the neighboring block (e.g., left neighboring block and/or top neighboring block) of the current block and additional candidate modes, and select one of the MPM candidates within the derived MPM list based on a received MPM index, and alternatively, select one of the remaining intra prediction modes not included in the MPM candidates based on remaining intra prediction mode information. Whether the intra prediction mode of the current block exists within the MPM list may be indicated based on an MPM flag.

The MPM list may also be referred to as an intra prediction mode candidate list, and may also be expressed as candModeList.

Here, for example, the MPM list may include three MPM candidates or six MPM candidates. As an example, the MPM list may include candidates derived based on the intra prediction mode of the neighboring block, the derived intra prediction mode and/or a default intra prediction mode. The encoding apparatus/decoding apparatus may search for the neighboring blocks of the current block according to a specific order, and derive the intra prediction mode of the neighboring block as the MPM candidate in the derived order. For example, the neighboring blocks may include a left neighboring block, a top neighboring block, a bottom left neighboring block, a top right neighboring block, and a top left neighboring block, and the encoding apparatus/decoding apparatus may search for the intra prediction mode of the left neighboring block, the intra prediction mode of the top neighboring block, the planar intra prediction mode, the DC intra prediction mode, the intra prediction mode of the bottom left neighboring bock, the intra prediction mode of the top right neighboring block, and the intra prediction mode of the top left neighboring block in the order to derive an MPM candidate and configure the MPM list of the current block. Meanwhile, after searching, if six MPM candidates are not derived, the MPM candidate may be derived based on the intra prediction mode derived as the MPM candidate. For example, if the intra prediction mode derived as the MPM candidate is an Nth intra prediction mode, the encoding apparatus/decoding apparatus may derive the N+1th intra prediction mode and/or the N−1th intra prediction mode as the MPM candidate of the current block. A detailed description of the neighboring blocks will be made later.

In addition, for example, whether the intra prediction mode applied to the current block is included in the MPM candidates, or included in the remaining intra prediction modes may be derived based on the MPM flag. Specifically, if the value of the MPM flag is 1, the MPM flag may represent that the intra prediction mode of the current block is included in the MPM candidates (MPM list), and if the value of the MPM flag is 0, the MPM flag may represent that the intra prediction mode of the current block is not included in the MPM candidates (MPM list) and included in the residual intra prediction modes. Meanwhile, the MPM index may be signaled in a form of mpm_idx or intra_luma_mpm_idx syntax elements, and the remaining intra prediction mode information may be signaled in a form of rem_intra_luma_pred_mode or intra_luma_mpm_remainder syntax elements. In addition, the MPM flag may be signaled in a form of an intra_luma_mpm_flag syntax element, and if the MPM flag is not signaled, the value of the MPM flag may also be regarded as 1. In addition, for example, the remaining intra prediction mode information may index the remaining intra prediction modes not included in the MPM candidates among all intra prediction modes in the order of the prediction mode number to indicate one among them. The intra prediction mode may be an intra prediction mode for a luma component (sample). Hereinafter, the intra prediction mode information may include at least one of the MPM flag, the MPM index, and the remaining intra prediction mode information. In addition, the MPM list may also be called various terms such as MPM candidate list and candModeList.

Meanwhile, the encoding apparatus may derive the MPM list of the current block based on the intra prediction mode of the neighboring block of the current block and the additional candidate modes, determine the intra prediction mode of the current block, and encode the intra prediction mode information of the current block to store and/or transmit the encoded intra prediction mode information.

Meanwhile, various intra prediction methods may be applied for the intra prediction. As an example, the prediction sample may also be generated through the interpolation between the second neighboring sample and the first neighboring sample located in the opposite direction of the prediction direction of the intra prediction mode of the current block with respect to the prediction sample of the current block among the neighboring reference samples. The aforementioned case may be called a linear interpolation intra prediction (LIP) or a linear interpolation intra prediction. As another example, the prediction sample may be derived using the reference sample located in the prediction direction in the corresponding line by selecting a reference sample line having the highest prediction accuracy among neighboring multi-reference sample lines of the current block and at this time, the intra prediction coding may be performed in a method for indicating (signaling) the used reference sample line to the decoding apparatus. The aforementioned case may be called multi-reference line (MRL) intra prediction or MRL-based intra prediction. As still another example, the intra prediction is performed based on the same intra prediction mode by dividing the current block into the vertical or horizontal sub-partitions, and the neighboring reference samples may be derived and used in a unit of the sub-partition. That is, in this case, the intra prediction mode of the current block is equally applied to the sub-partitions, and the neighboring reference sample is derived and used in a unit of the sub-partition, thereby enhancing intra prediction performance in some cases. Such a prediction method may be called an intra sub-partitions (ISP) or an ISP-based intra prediction. The aforementioned intra prediction methods may be called an intra prediction type differently from the intra prediction mode. The intra prediction type may be called various terms such as an intra prediction technique or an additional intra prediction mode. For example, the intra prediction type (or additional intra prediction mode or the like) may include at least one of the aforementioned LIP, MRL intra prediction, or ISP intra prediction. A general intra prediction method other than specific intra prediction types such as the LIP, MRL intra prediction, and ISP intra prediction may be called a normal intra prediction type. The normal intra prediction type may be generally applied if the aforementioned specific intra prediction type is not applied, and if the normal intra prediction type is applied, the intra prediction may be performed using the aforementioned intra prediction mode and the reference sample line adjacent to the current block as illustrated in FIG. 3.

The aforementioned LIP, MRL intra prediction, and ISP intra prediction may be described in detail as follows.

Figure 8:
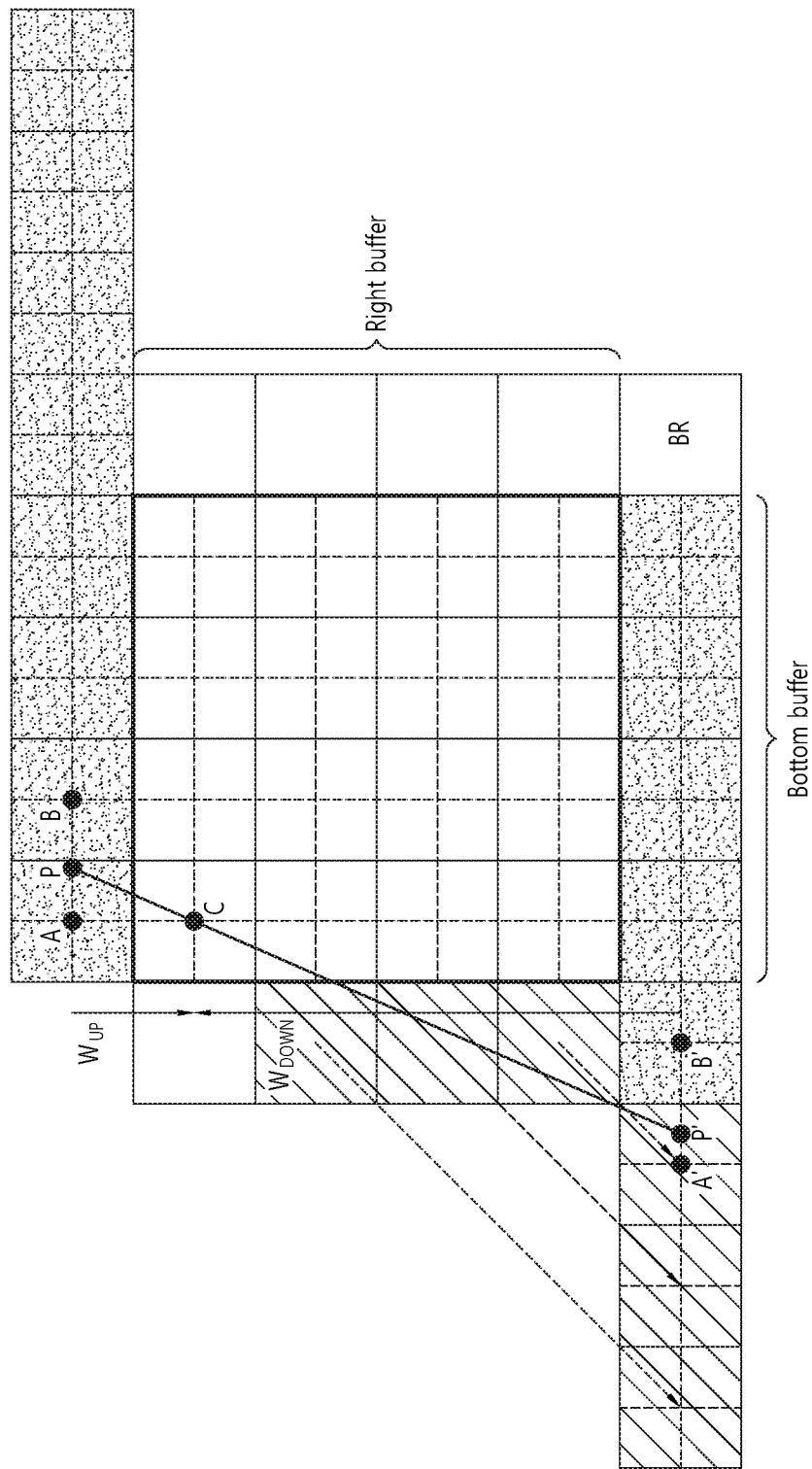

FIG. 8 exemplarily illustrates the LIP.

Generally, since the intra prediction simply copies the neighboring reference sample in order to derive the prediction sample, there is a tendency of increasing an error as a distance between the prediction sample and the reference sample is far away. The LIP may generate the prediction sample through the linear interpolation between the first neighboring reference sample located in the intra prediction direction and the second neighboring reference sample located in the opposite direction of the intra prediction direction in order to decrease the error generated in the intra prediction coding. To this end, a right buffer and a bottom buffer may be additionally generated. The right buffer may include the right neighboring reference samples of the current block, and the bottom buffer may include the bottom neighboring reference samples of the current block. The right buffer or the bottom buffer may include the bottom right neighboring reference sample of the current block. That is, the LIP may derive the right neighboring reference samples, the bottom right neighboring reference sample, and the bottom neighboring reference samples of the current block, and then perform the linear interpolation with the conventional reference samples (the left neighboring reference samples, the top left neighboring reference sample, and the top neighboring reference samples) to generate the prediction samples. Generally, since the blocks within the picture are encoded/decoded in a raster scan order, the right block, the bottom block, and the bottom right block with respect to the current block to be currently decoded are not decoded, such that the right neighboring reference samples, the bottom right neighboring reference samples, and the bottom neighboring reference samples of the current block have not been reconstructed, and the right neighboring reference samples, the bottom right neighboring reference samples, and the bottom neighboring reference samples of the current block are required to be derived.

That is, in order to perform the LIP, first, the neighboring reference samples of the current block are required to be derived. In this case, the left neighboring reference samples, the top left neighboring reference sample, and the top neighboring reference samples may use the reconstructed samples of the corresponding locations, and if there are some non-available samples, the corresponding non-available sample may be filled with an available sample through a substitution or padding procedure. In this case, for example, the non-available sample may be substituted or padded with another neighboring reference sample adjacent to the corresponding sample.

Meanwhile, since the right neighboring reference samples, the bottom right neighboring reference sample, and the bottom neighboring reference samples among the neighboring reference samples are located in a block not decoded yet in the decoding order, the reconstructed sample may not exist at the corresponding location, and the present disclosure may derive the right neighboring reference samples, the bottom right neighboring reference sample, and the bottom neighboring reference samples through various methods. As an example, the right neighboring reference samples, the bottom right neighboring reference sample, and the bottom neighboring reference samples among the neighboring reference samples may be generated using the previously derived top neighboring reference samples and left neighboring reference samples. In this case, the bottom right neighboring reference sample may be first derived based on at least one of the top neighboring reference samples and at least one of the left neighboring reference samples, and the bottom neighboring reference samples and the right neighboring reference samples may be derived using the derived bottom right neighboring reference sample, the left neighboring reference sample, and the top neighboring reference sample. In this case, the bottom neighboring reference samples and the right neighboring reference samples may be derived through the linear interpolation according to the distance. Alternatively, values of the bottom neighboring reference samples and the right neighboring reference samples may also be derived by copying values of the corresponding left neighboring reference samples and top neighboring reference samples according to the locations of the bottom neighboring reference samples and the right neighboring reference samples.

Hereinafter, a method for generating the right neighboring reference samples, the bottom right neighboring reference samples, and the bottom neighboring reference samples not reconstructed yet in the decoding order will be described. Although the present example is described based on a square block shape, the method according to the present example may be applied thereto equally/similarly in order to enhance intra prediction efficiency even if the current block has a non-square block shape. Hereinafter, the neighboring reference sample may be called a neighboring sample.

First, the bottom right neighboring reference sample of the current block may be generated in the following method.

Figure 9:
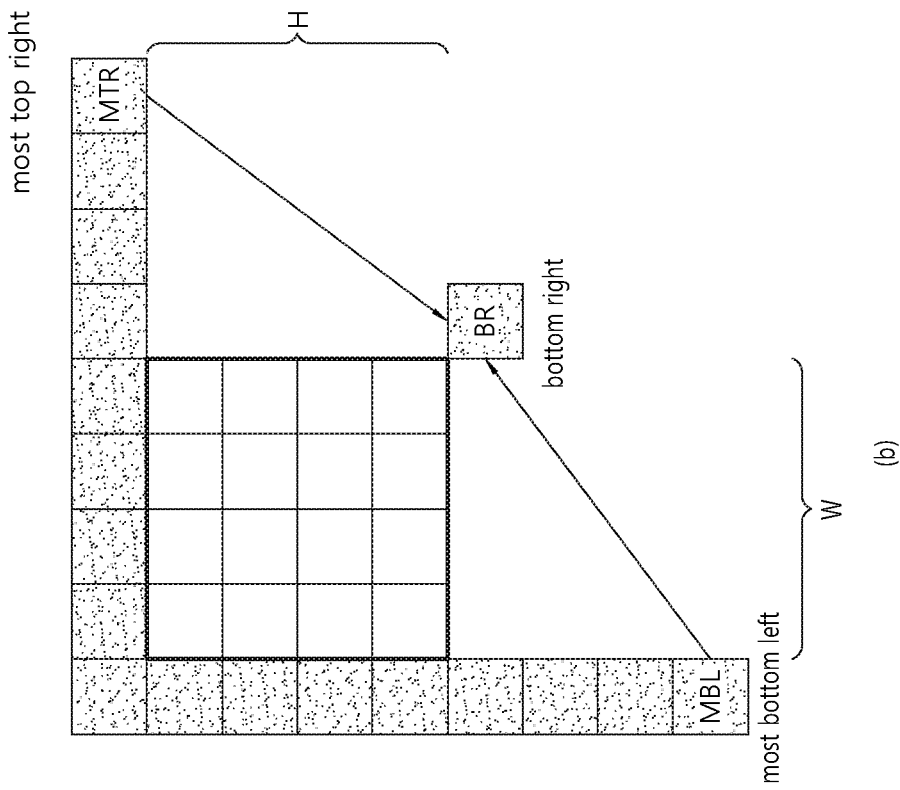
FIG. 9 illustrates an example of a method for generating a bottom right neighboring sample of a current block.
Figure 9:
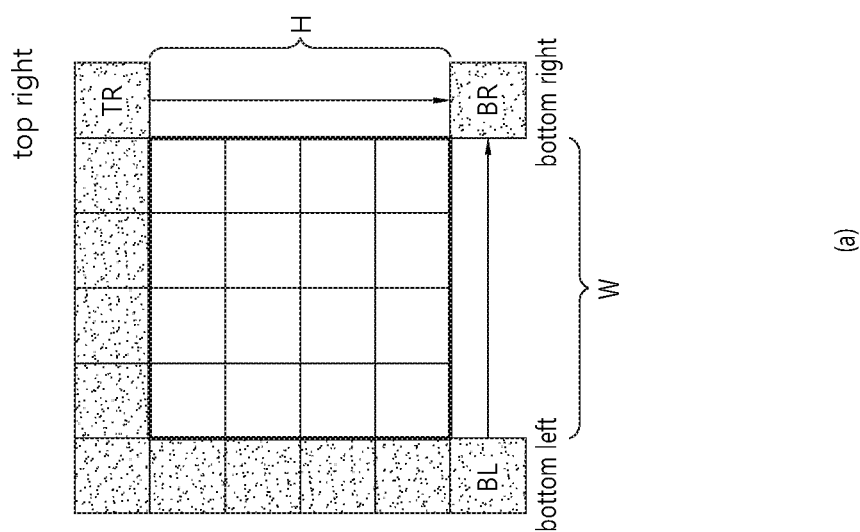

FIG. 9 illustrates an example of a method for generating a bottom right neighboring sample of the current block.

Referring to (a) of FIG. 9, a bottom right neighboring sample BR may be generated using a top right neighboring sample TR located on the top right corner of the current block, and a bottom left neighboring sample BL located on the bottom left corner of the current block. For example, when the top left sample position of the current block is regarded as (0, 0), the top right neighboring sample TR may be expressed as p[W][−1], the bottom left neighboring sample BL may be expressed as p[−1][H], and the bottom right neighboring sample BR may be expressed as p[W][H]. Here, the W and H correspond to the width and height of the current block, respectively.

Referring to (b) of FIG. 9, a bottom right neighboring sample BR may be generated using a neighboring sample MTR located on the rightmost among the top neighboring samples of the current block and a neighboring sample MBL located on the lowermost among the left neighboring samples thereof. For example, the top neighboring samples and the left neighboring samples may have the number by the number of W+H, respectively, and when the top left sample position of the current block is regarded as (0, 0), the neighboring sample MTR may be expressed as p[W+H][−1], the neighboring sample MBL may be expressed as p[−1][H+W], and the bottom right neighboring sample BR may be expressed as p[W][H].

The bottom right neighboring sample BR may also be derived based on an average value as in the following equations, and alternatively, derived based on a distance ratio.

$$BR=(TR+BL+1)\gg 1 \qquad \text{Equation 1}$$

$$BR=(MTR+MBL+1)\gg 1 \qquad \text{Equation 2}$$

$$BR=(W*TR+H*BL+((W+H)\gg 1))/(W+H) \qquad \text{Equation 3}$$

$$BR=(W*MTR+H*MBL+((W+H)\gg 1))/(W+H) \qquad \text{Equation 4}$$

Here, as described above, BR corresponds to the bottom right neighboring sample, TR corresponds to the top right neighboring sample located on the top right corner of the current block, BL corresponds to the bottom left neighboring sample located on the bottom left corner of the current block, MTR corresponds to the neighboring sample located on the rightmost among the top neighboring samples of the current block, MBL corresponds to the neighboring sample located on the lowermost among the left neighboring samples, and W and H correspond to the width and height of the current block, respectively.

Meanwhile, the bottom neighboring samples and the right neighboring samples as well as the bottom right neighboring sample of the current block are required to be generated for the LIP. If the blocks are coded in the raster scan order, in the coding time point of the current block, the bottom, bottom right, and right block of the current block have not been coded yet. Therefore, the bottom neighboring samples and the right neighboring samples are required to be generated for the LIP. In this case, the bottom right neighboring sample derived according to the aforementioned method may be used. Specifically, the bottom neighboring samples and right neighboring samples of the non-square current block may be generated using the derived bottom right neighboring sample, and the previously decoded top neighboring sample and left neighboring sample.

Figure 10:
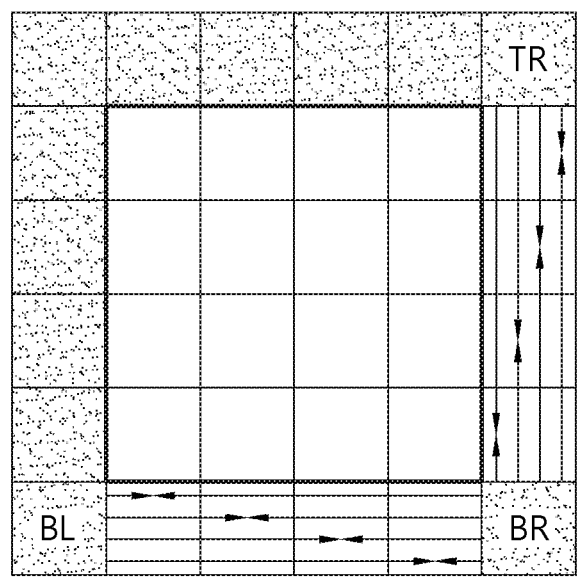
FIG. 10 illustrates an example of a method for generating bottom neighboring samples and right neighboring samples using the bottom right neighboring sample.

FIG. 10 illustrates an example of a method for generating the bottom neighboring samples and the right neighboring samples using the bottom right neighboring sample.

Referring to FIG. 10, the bottom neighboring samples may be generated by linearly interpolating the bottom right neighboring sample BR of the current block and the bottom left neighboring sample BL located on the bottom left corner of the current block according to the distance. In addition, the right neighboring samples may be generated by linearly interpolating the bottom right neighboring sample BR of the current block and the top right neighboring sample TR located on the top right corner of the current block according to the distance. For example, if the top right neighboring sample TR is expressed as p[W][−1], the bottom left neighboring sample BL is expressed as p[−1][H], and the bottom right neighboring sample BR is expressed as p[W][H], the bottom neighboring samples may be expressed as p[0][H] . . . p[W−1][H], and the right neighboring samples may be expressed as p[W][0] . . . p[W][H−1]. In this case, for example, the bottom neighboring sample p[x][H] may be derived based on the interpolation according to the distances of the p[−1][H] and the p[W][H] for the corresponding sample location (x, H). In addition, for example, the right neighboring sample p[W][y] may be derived based on the interpolation according to the distance between the p[W][−1] and the p[W][H] for the corresponding sample location (W, y). Meanwhile, the bottom neighboring samples and the right neighboring samples may also be generated using the left neighboring samples and the top neighboring samples of the current block without using the bottom right neighboring sample of the current block.

After generating the bottom neighboring samples and the right neighboring samples, the LIP may be performed using the generated bottom neighboring samples and right neighboring samples. As in FIG. 8 described above, the method for generating a current prediction sample C using the LIP may be performed as follows, for example. FIG. 8 illustrates a prediction mode as a vertical series of mode having positive directionality as an example.

1) Left neighboring samples are copied to the lower end sample buffer and a bottom buffer is generated using the generated bottom neighboring sample.

2) A prediction sample value P is generated by interpolating a reference sample A and a reference sample B of the top reference buffer using a reconstructed value.

3) A prediction sample P' is generated by interpolating a reference sample A' and a reference sample B' of the bottom reference buffer newly generated.

4) A final prediction value C is generated by linearly interpolating the generated P and P'.

$$C=(w_{UP}*P+w_{DOWN}*P'+(w_{UP}+w_{DOWN})/2)/(w_{UP}+w_{DOWN})$$ Equation 5

A prediction sample value may be generated by applying the methods 2) to 4) to all samples within the current block. The LIP method may be applied to all directionality modes other than a planar mode and a DC mode whose directionality do not exist.

Meanwhile, the MRL intra prediction may be performed as follows.

The conventional intra prediction uses only the neighboring samples of the first top line and the neighboring samples of the first left line of the current block as the reference samples for the intra prediction. However, the Multiple-reference line (MRL) method may perform the intra prediction using the neighboring samples located in the sample line separated by one or three sample distances with respect to the top and/or left of the current block as the reference samples.

Figure 11:
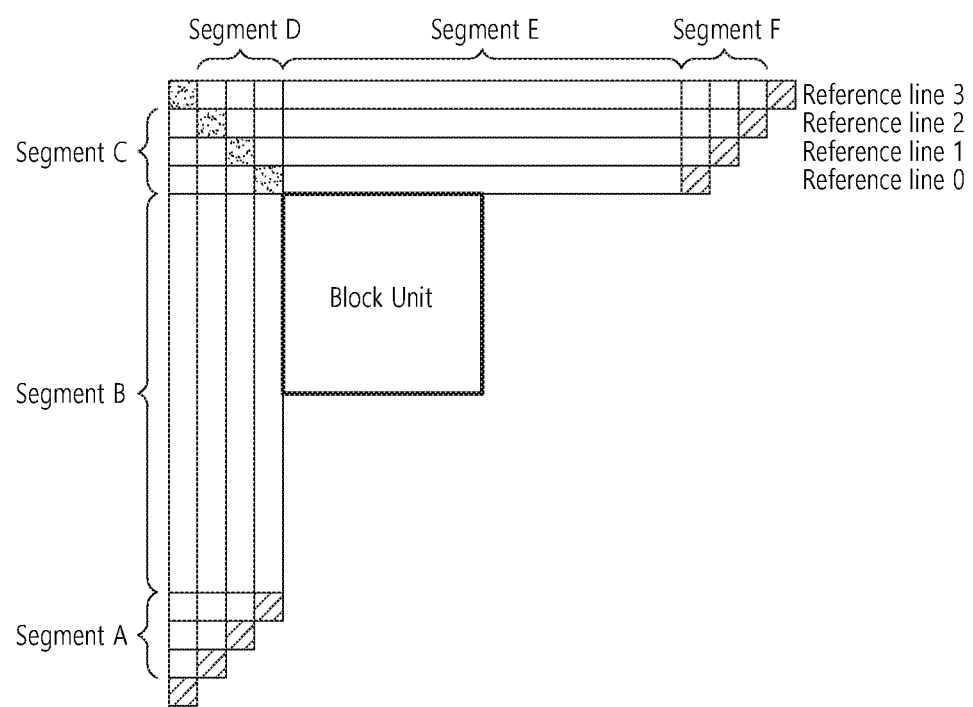
FIG. 11 illustrates an example of the MRL.

FIG. 11 illustrates an example of the MRL, and here, a multi-reference line index represents whether any line is used for the intra prediction with respect to the current block. The multi-reference line index may be called an MRL index, and configured in a form of an intra_luma_ref_idx syntax element. If a value of the multi-reference line index is 0, it may be indicated that only the neighboring reference samples of the conventional first line are used as the reference samples for the intra prediction, and the values of the multi-reference line index larger than 0 may indicate that the neighboring reference samples of the lines other than the conventional first line are used as the reference samples for the intra prediction. For example, the multi-reference line index may indicate the following intra reference sample line.

TABLE 3

| Intra_luma_ref_idx[x0][y0] | IntraLumaRefLineIdx[x0][y0] |
|---|---|
| 0 | 0 |
| 1 | 1 |
| 2 | 3 |

That is, if the MRL intra prediction is applied to the current block, the intra prediction may be performed (derivation of the predicted block) based on the intra prediction mode of the current block and the neighboring reference samples of the neighboring reference sample line indicated by the value of the MRL index.

Meanwhile, the ISP intra prediction may be performed as follows.

The normal intra prediction performs prediction without split by regarding the block to be currently coded as one processing unit. However, the ISP intra prediction method performs the intra prediction by splitting the block to be currently coded horizontally or vertically. At this time, the reconstructed block is generated by performing the encoding/decoding in a unit of the split block and (the reconstructed samples of) the reconstructed block is used as the reference block (reference samples) of the block to be next split.

Figure 12:
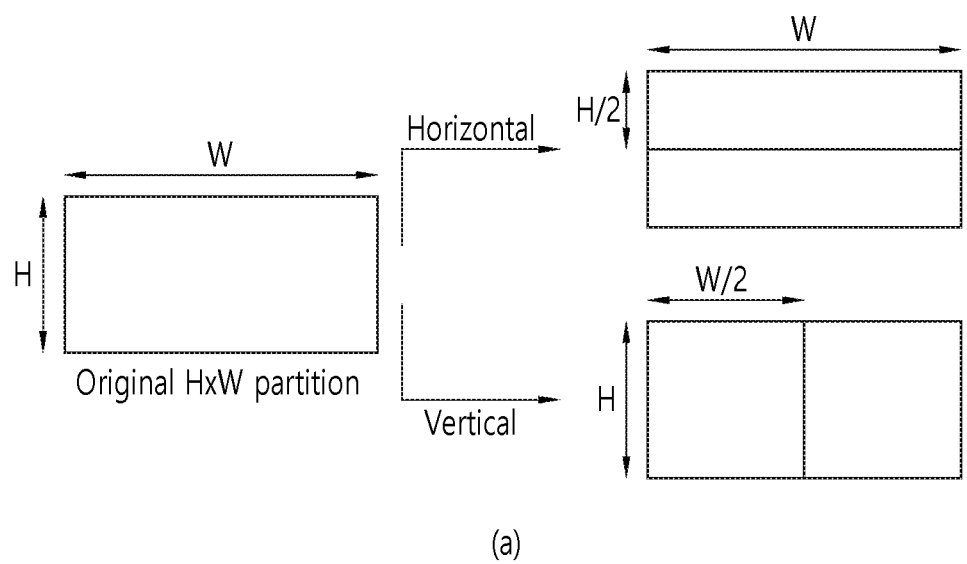
FIG. 12 illustrates an example of the split according to the size of the current block (e.g., CU/CB).
Figure 12:
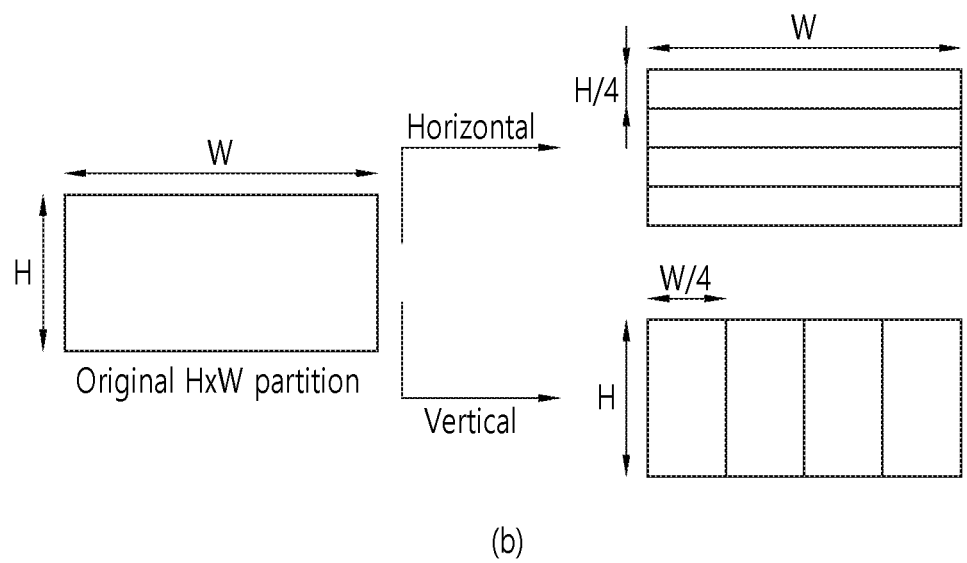

Table 4 and FIG. 12 illustrate an example of the split according to the size of the current block (e.g., CU/CB).

TABLE 4

| Block size (CU) | The number of splits |
|---|---|
| 4 × 4 | No split |
| 4 × 8, 8 × 4 | 2 |
| All different cases | 4 |

If the ISP intra prediction type is applied, an optimal mode may be generated by generating an MPM list according to the respective split methods (horizontal split and vertical split) in order to decrease coding complexity and comparing a suitable prediction mode among the prediction modes within the generated MPM list in view of rate distortion optimization (RDO). In addition, if the intra prediction of the aforementioned multi-reference line (MRL) is used, the aforementioned intra sub-partition method may be limited not to be used. That is, in this case, the intra sub-partition method may be applied only in the case of using the first line (0th) reference line (i.e., a value of intra_luma_ref_idx is 0).

The ISP intra prediction method first transmits whether to apply the intra sub-partition in a unit of block and if the current block uses the intra sub-partition (intra_subpartitions\_mode\_flag), information (intra\_subpartitions\_split\_flag) about whether it is horizontal split or vertical split may be signaled.

If the ISP intra prediction method is applied, the intra prediction mode of the current block is equally applied to the sub-partitions, and the neighboring reference sample may be derived in a unit of the sub-partition and used, thereby enhancing intra prediction performance. That is, if the intra sub-partition method is applied, a residual sample processing procedure is performed in a unit of sub-partition. That is, the intra prediction samples are derived for the respective sub-partitions, and a residual signal (residual samples) for the corresponding sub-partition is added to the intra prediction samples, such that the reconstructed samples are acquired. The residual signal (residual samples) may be derived through dequantization/inverse transform, or the like based on residual information (quantized transform coefficient information or residual coding syntax) within the aforementioned bit stream. That is, the prediction samples and the residual samples for a first sub-partition may be derived, and the reconstructed samples for the first sub-partition may be derived based on the derived prediction samples and residual samples. In this case, when the prediction samples for a second sub-partition are derived, some (e.g., the left or top neighboring reference samples of the second sub-partition) of the reconstructed samples within the first sub-partition may be used as the neighboring reference samples for the second sub-partition. Likewise, the prediction samples and the residual samples may be derived for the second sub-partition, and the reconstructed samples for the second sub-partition may be derived based on the derived prediction samples and residual samples. In this case, when the prediction samples for a third sub-partition are derived, some (e.g., the left or top neighboring reference samples of the third sub-partition) of the reconstructed samples within the second sub-partition may be used as the neighboring reference samples for the third sub-partition. The following is the same.

Meanwhile, a number of intra prediction modes are currently considered for enhancing intra prediction performance, and the content in which the encoding apparatus sequentially performs the intra prediction for all intra prediction modes to determine the optimal intra prediction mode based on the rate-distortion optimization (RDO) is not preferable in terms of computational complexity or a load. Therefore, in consideration of such a point, the optimal intra prediction mode may be, for example, determined as follows.

Figure 13:
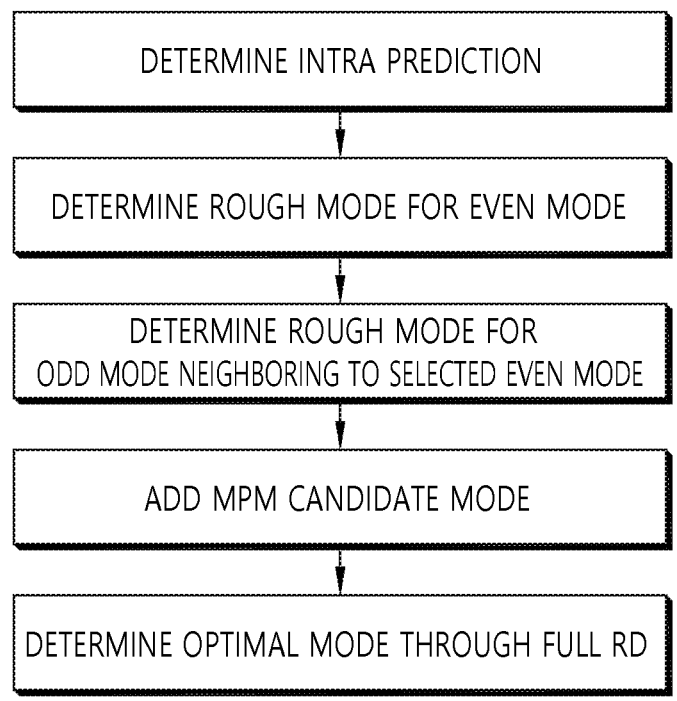
FIG. 13 illustrates an example of a method for determining an intra prediction mode in the encoding apparatus.

FIG. 13 illustrates an example of a method for determining the intra prediction mode in the encoding apparatus.

Referring to FIG. 13, if the intra prediction is applied to the current block, a candidate even-numbered mode is first determined. For example, the candidate even-numbered mode for full rate-distortion (RD) may be determined through a rough mode decision method for the even-numbered modes. At this time, the rough mode decision method determines a cost value based on a difference between a prediction block and an original block and a bit necessary for simply coding mode information and determines a mode with a small cost value as a candidate mode. Next, the rough mode decision method re-determines a candidate mode for the Full RD for odd-numbered modes obtained by adding and subtracting 1 to and from the determined even-numbered mode (e.g., if the selected even-numbered mode is 20, the odd-numbered mode obtained by adding and subtracting 1 to and from the even-numbered mode are a 19th mode and a 21th mode) through the rough mode decision method.

After determining the candidate mode through the rough mode determination, the rough mode decision method searches for a similar mode neighboring to the current block (i.e., the intra prediction mode of the neighboring block) using the most probable mode (MPM) method and adds the similar mode to the candidate mode. Lastly, the rough mode decision method may determine an optimal intra prediction mode through the Full RD in view of the rate-distortion optimization (RDO).

Meanwhile, whether the aforementioned specific prediction type (e.g., LIP, MRL, and/or ISP) is applied may be determined based on the size of the block and/or the intra prediction mode. The following description is made based on the LIP but this is illustrative and the following method may also be applied to the MRL, the SIP, and the like.

For example, a linear interpolation intra prediction (LIP) may be variably applied according to the size of the current block. Generally, the LIP is efficient for a case where the image with a complicated shape exists within the block. Therefore, it is efficient not to use a linear interpolation intra prediction in the block including a simple image area.

In the case of the video/image coding, generally the block including the complicated image area is split and thus the size of the processing unit block is gradually decreased. On the other hand, the block including the simple image area is not split and coded in units of the large-sized block. Therefore, whether the LIP is applied may be variably determined based on the size of the block to be currently coded. At this time, whether the LIP is applied may be 1) determined in consideration of only the width of the current block, 2) determined in consideration of only the height thereof, 3) determined in consideration of both the width and the height thereof, and 4) determined in consideration of the area (width×height) of the block as factors of determining whether the LIP is applied.

One example of defining a criterion of the size of the block for determining whether the LIP is applied is as follows. This example defines a reference length for applying the LIP as 16. The 16 defined in this example may be variably determined and any case of four cases below may be selected and used.

1) A case of determining whether the LIP is applied in consideration of only the width: if the width of the block <16, the LIP is applied.

2) A case of determining whether the LIP is applied in consideration of only the height: if the height of the block <16, the LIP is applied.

3) A case of determining whether the LIP is applied in consideration of both the width and the height: if the width of the block <16 and the height of the block <16, the LIP is applied.

4) A case of determining whether the LIP is applied in consideration of the area of the block: if the area of the block <(16×16), the LIP is applied.

Meanwhile, the LIP may also be variably applied according to the intra prediction mode of the current block. Generally, the vertical direction mode, the horizontal direction mode, and the diagonal direction mode other than the planar mode and the DC mode have the high frequency of occurrence compared to other general modes. Therefore, the exemplary embodiment proposes a method in which the LIP is applied to only a specific intra prediction mode having the high frequency of occurrence.

The method for applying the LIP to the specific intra prediction mode generally includes 1) a method for applying the LIP to only the specific mode having the high frequency of occurrence, and 2) a method for applying the LIP including the mode neighboring to the specific mode having the high frequency of occurrence. At this time, the specific intra prediction mode to which the LIP is to be applied may also be defined as the vertical direction mode, the horizontal directional mode, and/or the diagonal direction mode, or the like in advance, and may also be adaptively signaled. Alternatively, the specific intra prediction mode may be adaptively derived in consideration of the frequency of occurrence.

Figure 14:
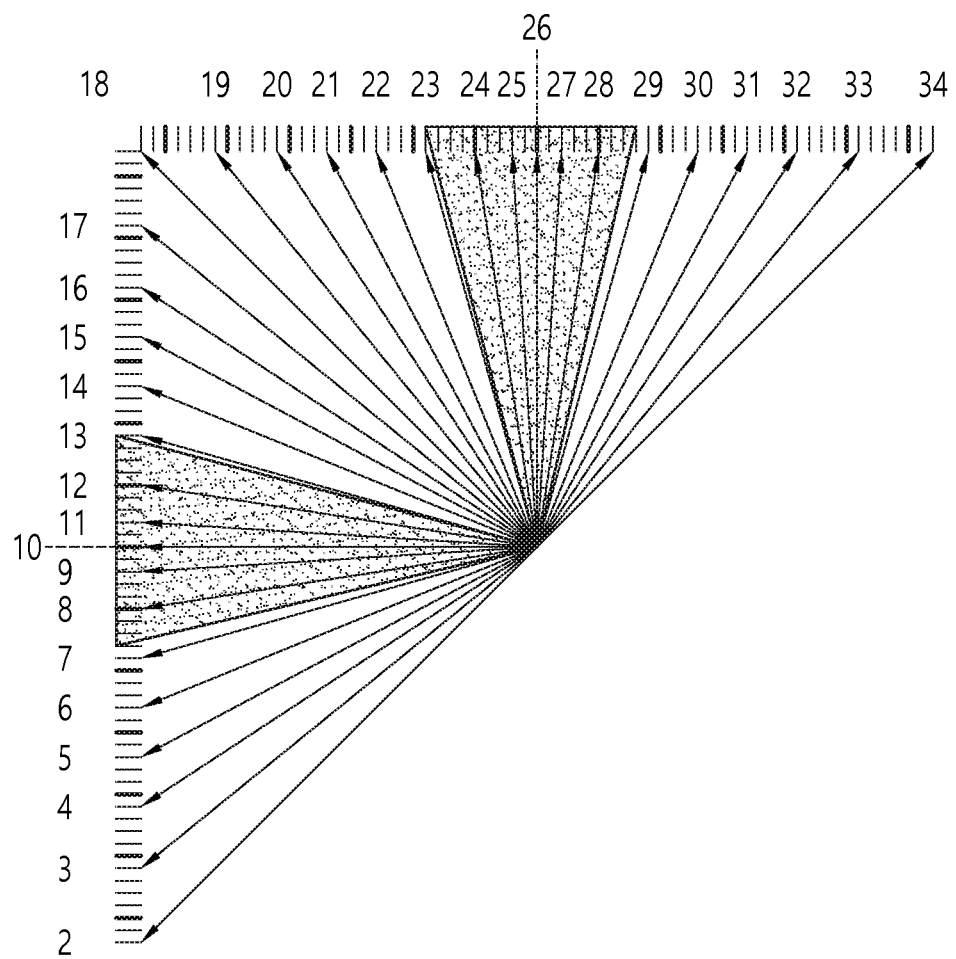
FIG. 14 exemplarily illustrates a specific intra prediction mode to which the LIP is to be applied.

FIG. 14 exemplarily illustrates a specific intra prediction mode to which the LIP is to be applied.

As illustrated in FIG. 14, the linear interpolation intra prediction mode may be applied to only the neighboring mode including the vertical direction mode and the horizontal directional mode. FIG. 14 illustrates an example of applying the LIP to the vertical direction mode and neighboring four modes (from the vertical direction mode+2 modes to the vertical direction mode−2 modes) in the vertical direction mode and the LIP to the horizontal directional mode and neighboring four modes (from the horizontal directional mode+2 modes to the horizontal directional mode−2 modes) in the horizontal directional mode. Although the example illustrated in FIG. 14 has represented the vertical direction mode and the horizontal directional mode as the example of the specific intra prediction mode, the specific intra prediction mode may also be selected as other different modes. In addition, although the example illustrated in FIG. 7 has limited a range in which the linear interpolation intra prediction mode is applied up to ±2 modes neighboring to the specific intra prediction mode, this is illustrative, and the application range may be determined as ±n (n refers to a non-negative integer) fixedly or variably.

In addition, whether the LIP is applied may also be determined further based on the shape of the current block. For example, the block having a non-square shape variably applies the LIP. The current video coding may perform the coding using the non-square blocks having various shapes in order to enhance coding efficiency.

Figure 15:
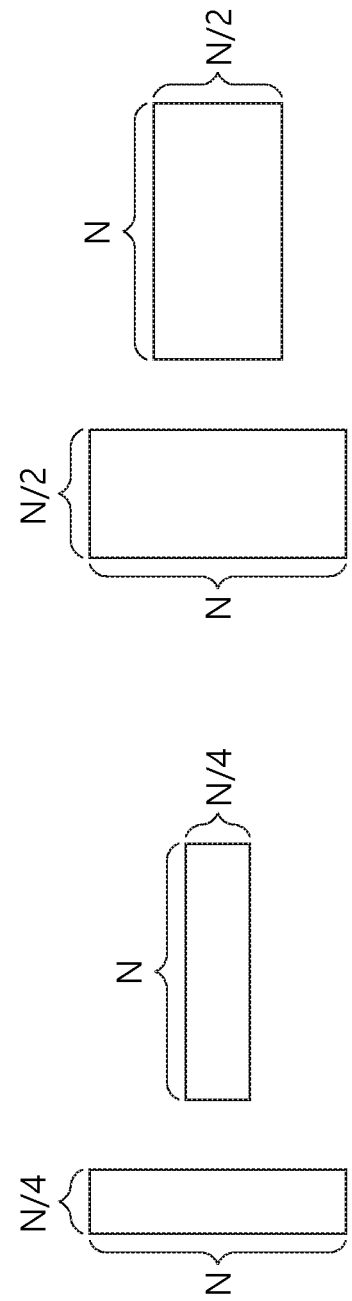
FIG. 15 illustrates an example of various non-square blocks.

FIG. 15 illustrates an example of various non-square blocks.

Referring to FIG. 15, a first non-square block (N/4×N) or a third non-square block (N/2×N) has a small width and a large height. In this case, a horizontal prediction mode for performing the prediction mainly using a left reference sample is used, and in this case, a distance between the prediction sample and the reference sample is short, thereby causing few prediction errors. Conversely, since the vertical direction mode performs the prediction using a top reference sample, the distance between the reference sample and the prediction sample is long, thereby causing many prediction errors. Therefore, the first non-square block (N/4×N) does not apply the LIP to the mode having the horizontal directionality and conversely, may apply the LIP to only the mode having the vertical directionality. If the same method is applied to a second non-square block (N×N/4) and a fourth non-square block (N×N/2), the non-square block having the long width and the short height applies the LIP to the mode having the horizontal directionality and does not apply the LIP to the mode having the vertical directionality. Table 5 expresses a method for applying the LIP based on the comparison of the width and height of the current block, and the intra prediction mode, if the non-square block is the current block.

TABLE 5

| | Whether LIP is applied | |
|---|---|---|
| Block shape | Horizontal direction mode | Vertical direction mode |
| Width < height | X | ◯ |
| Width > height | ◯ | X |

In addition, the exemplary embodiment of the present disclosure may determine an optimal intra prediction mode in consideration of the aforementioned specific intra prediction type (e.g., LIP, MRL, and/or ISP) and efficiently signal the optimal intra prediction mode to the decoding apparatus. According to the aforementioned exemplary embodiment, the specific intra prediction type (e.g., LIP, MRL, and ISP) may be limitedly applied to only the candidate modes generated in the MPM list. That is, if the specific intra prediction type is applied, one of the candidate modes within the MPM list may be limited to be used for the current block, and in this case, an MPM flag may be omitted from the information about the intra prediction mode, thereby decreasing the number of bits to be signaled. Considering that one picture is split into a considerable number of blocks and coded, the decrease in the number of bits may enhance the overall coding efficiency.

Figure 16:
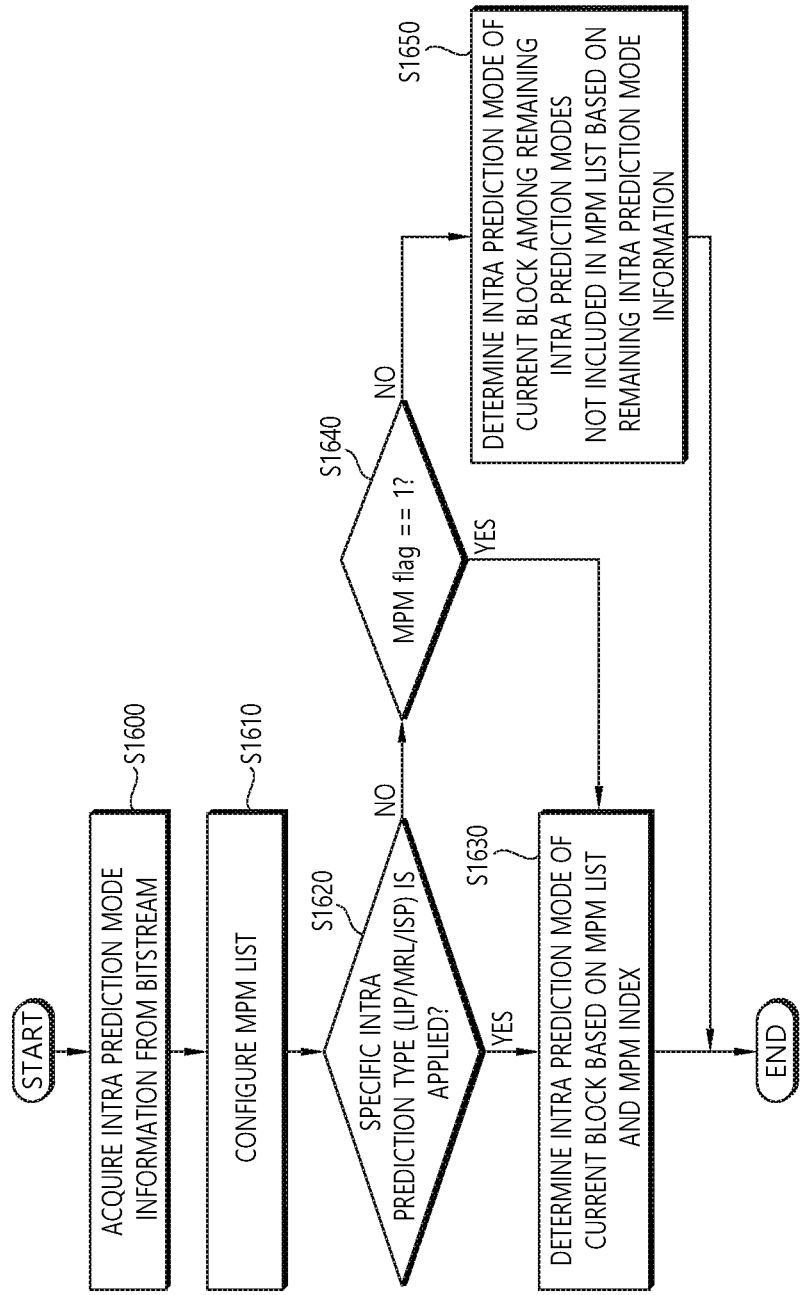
FIG. 16 illustrates a method for signaling an intra prediction mode according to an exemplary embodiment of the present disclosure.

FIG. 16 illustrates a method for signaling the intra prediction mode according to the exemplary embodiment of the present disclosure.

Referring to FIG. 16, the decoding apparatus acquires intra prediction mode information from a bitstream (S1600). As described above, the intra prediction mode information may include at least one of the MPM flag, the MPM index, and the remaining intra prediction mode information.

The decoding apparatus configures an MPM list (S1610). The MPM list is configured to be the same as the MPM list configured in the encoding apparatus. That is, the MPM list may also include the intra prediction mode of the neighboring block, and may further include specific intra prediction modes derived according to the aforementioned method. The MPM list may also be variously configured according to the intra prediction type, or the MPM list may also be configured regardless of the intra prediction type of the current block.

Although it has been illustrated that the S1610 is performed after the S1600, this is illustrative, and the S1610 may also be performed prior to the S1600 and the S1610 and the S1600 may also be performed simultaneously.

The decoding apparatus may determine the intra prediction mode of the current block based on the MPM list and the intra prediction mode information.

The decoding apparatus determines whether the specific intra prediction type is applied to the current block (S1620). The specific intra prediction type may include the aforementioned LIP type, MRL intra prediction type, and/or ISP prediction type. For example, the decoding apparatus may acquire the information about the intra prediction type from the bitstream.

If the specific intra prediction type is applied, the decoding apparatus may determine that the intra prediction mode of the current block exists in the MPM list. In this case, the decoding apparatus may derive a candidate intra prediction mode within the MPM list indicated by an MPM index as the intra prediction mode of the current block by parsing and decoding the MPM index without parsing the MPM flag (S1630). That is, in this case, the information about the intra prediction mode of the current block does not include the MPM flag. In this case, the decoding apparatus may estimate or regard a value of the MPM flag as 1 even without parsing the MPM flag, and the encoding apparatus may not encode the value of the MPM flag upon the intra prediction encoding as described above.

Meanwhile, if the specific intra prediction type is not applied, that is, if a normal intra prediction is applied, the information about the intra prediction mode includes the MPM flag, and in this case, the decoding apparatus confirms whether the value of the MPM flag is 1 (S1640).

If the value of the MPM flag is 1, the decoding apparatus may derive the candidate intra prediction mode within the MPM list indicated by the MPM index as the intra prediction mode of the current block.

Meanwhile, if the value of the MPM flag is 0, the decoding apparatus may derive the intra prediction mode of the current block among the remaining intra prediction modes not included in the MPM list based on the remaining intra prediction mode information included in the information about the intra prediction mode (S1650).

As described above, a predicted block may be generated based on the derived intra prediction mode, and the reconstructed block/picture may be generated based on the predicted block.

Meanwhile, the intra prediction mode derivation and intra prediction procedure according to each prediction type may be specifically performed, for example, as follows.

Figure 17:
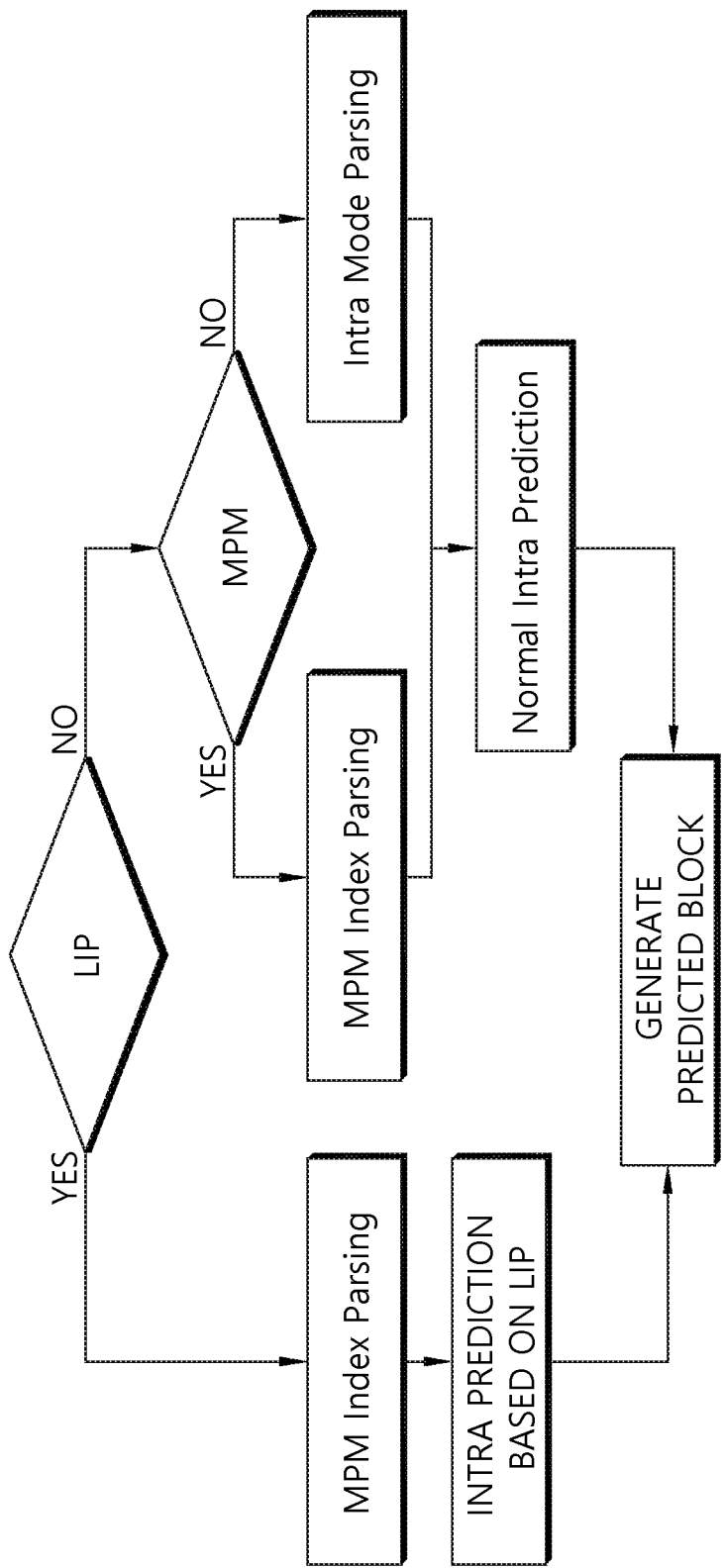
FIG. 17 exemplarily illustrates an intra prediction mode derivation and intra prediction procedure based on an LIP type.

FIG. 17 exemplarily illustrates the intra prediction mode derivation and intra prediction procedure based on the LIP type.

Referring to FIG. 17, the decoding apparatus determines whether the LIP is applied to the current block. For example, the decoding apparatus may acquire an LIP flag from a bitstream, and if a value of the LIP flag is 1, the decoding apparatus may determine that the LIP is applied to the current block.

If the LIP is applied to the current block, the decoding apparatus may derive the intra prediction mode for the LIP from the MPM list by parsing the MPM index from the bitstream. In this case, the decoding apparatus may directly parse the MPM index without having to parse the MPM flag. The decoding apparatus may generate the predicted block by performing the intra prediction based on the LIP type and the intra prediction mode.

Meanwhile, if the LIP is not applied to the current block, the decoding apparatus may parse the MPM flag to the bitstream, and if the value of the MPM flag is 1, the decoding apparatus may derive the intra prediction mode for the normal intra prediction by parsing the MPM index. Meanwhile, if the value of the MPM flag is 0, the decoding apparatus may parse the remaining intra mode information from the bitstream, and derive the intra prediction mode of the current block among the intra prediction modes other than the candidate intra prediction modes included in the MPM list based on the remaining intra mode information.

The decoding apparatus may generate the predicted block by performing the intra prediction based on the intra prediction mode.

Figure 18:
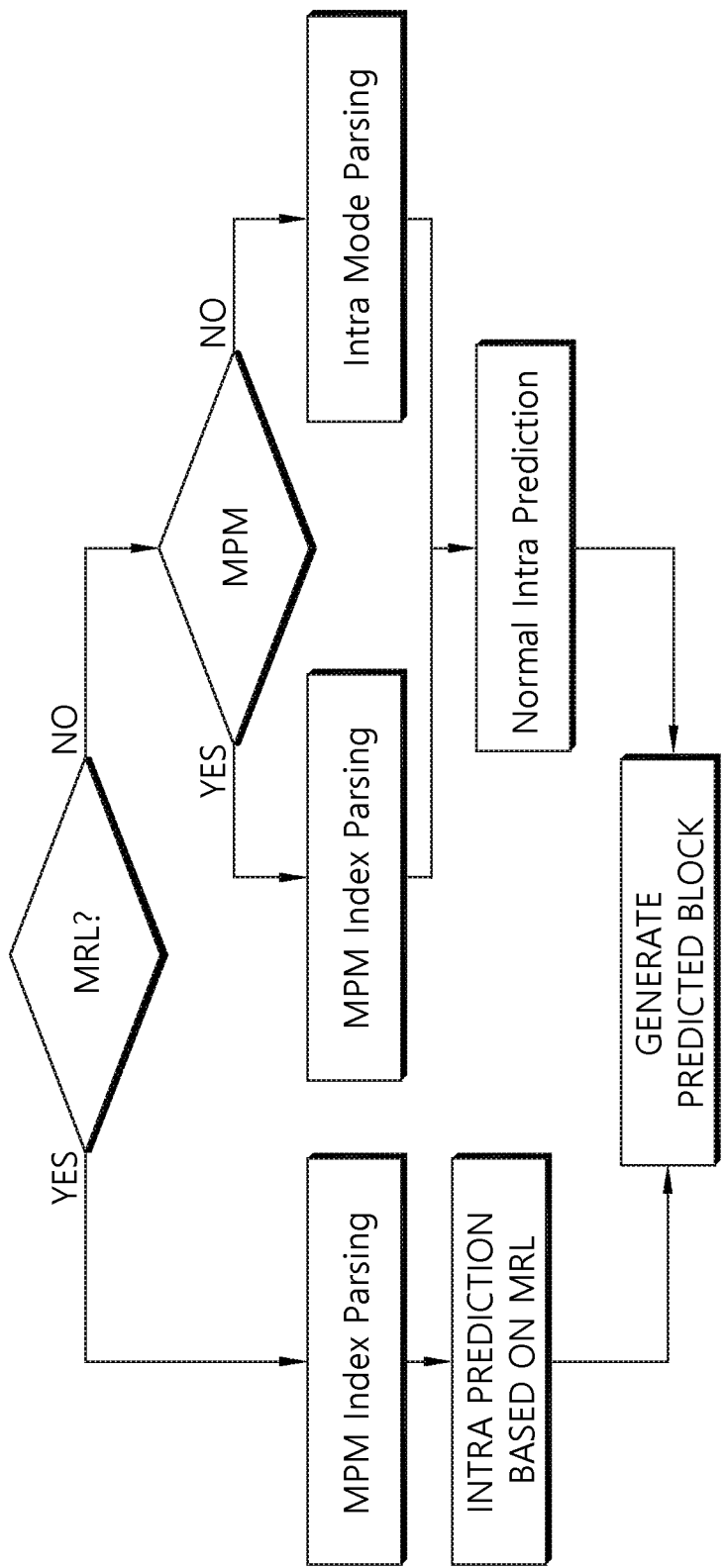
FIG. 18 exemplarily illustrates an intra prediction mode derivation and intra prediction procedure based on an MRL intra prediction type.

FIG. 18 exemplarily illustrates the intra prediction mode derivation and intra prediction procedure based on an MRL intra prediction type.

Referring to FIG. 18, the decoding apparatus determines whether the MRL intra prediction is applied to the current block. For example, the decoding apparatus may acquire a multi-reference line index (e.g., intra_luma_ref_idx) from the bitstream, and determine that the MRL intra prediction is applied if a value of the multi-reference line index is larger than 0. Meanwhile, if the value of the multi-reference line index is 0, the decoding apparatus may determine that the normal intra prediction is applied.

If the MRL intra prediction is applied to the current block, the decoding apparatus may derive the intra prediction mode for the MRL intra prediction from the MPM list by parsing the MPM index from the bitstream. In this case, the decoding apparatus may directly parse the MPM index without having to parse the MPM flag. The decoding apparatus may generate a predicted block by performing the intra prediction based on the MRL intra prediction type and the intra prediction mode.

Meanwhile, if the MRL intra prediction is not applied to the current block, the decoding apparatus may parse the MPM flag to the bitstream, and derive the intra prediction mode for the normal intra prediction by parsing the MPM index if the value of the MPM flag is 1. Meanwhile, if the value of the MPM flag is 0, the decoding apparatus may parse the remaining intra mode information from the bitstream, and derive the intra prediction mode of the current block among the intra prediction modes other than the candidate intra prediction modes included in the MPM list based on the remaining intra mode information.

The decoding apparatus may generate the predicted block by performing the intra prediction based on the intra prediction mode.

Figure 19:
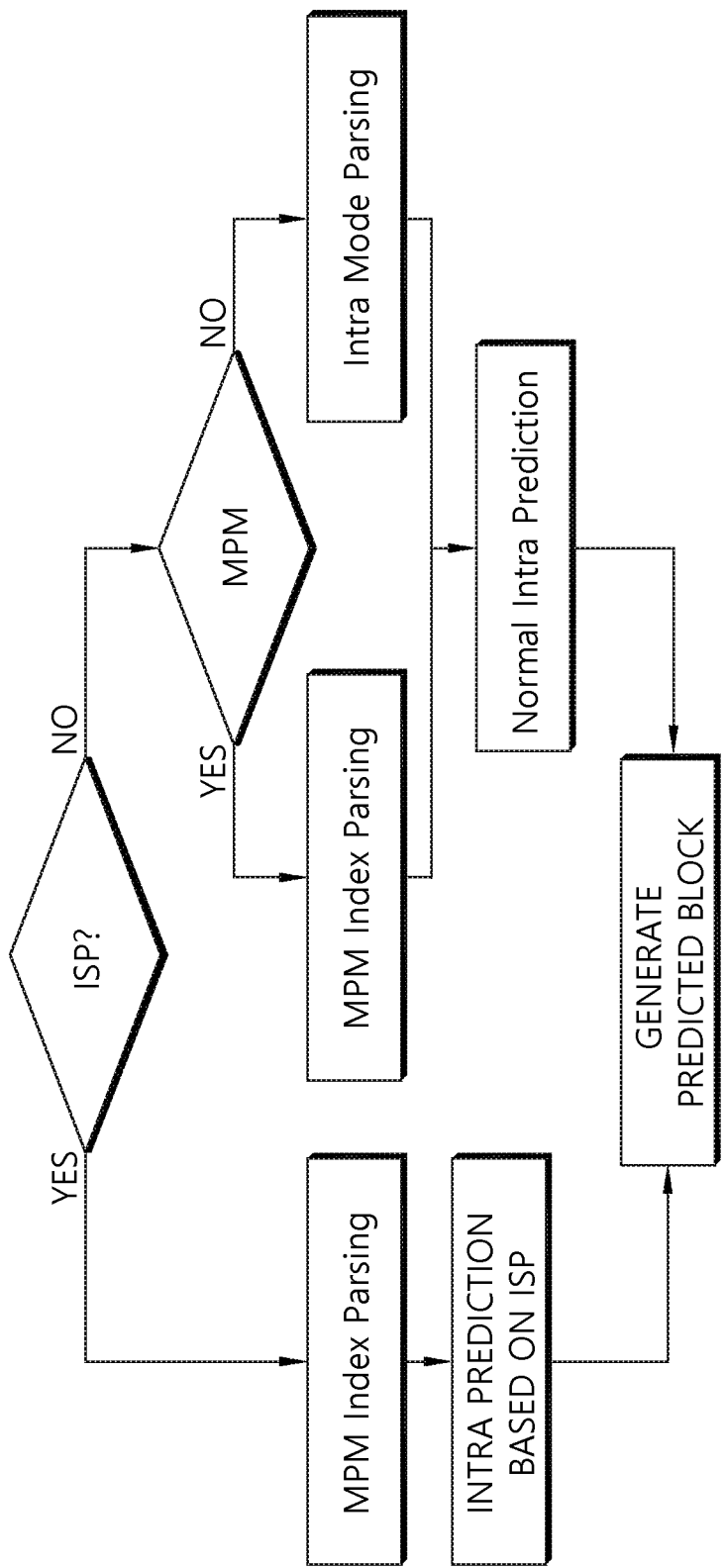
FIG. 19 exemplarily illustrates an intra prediction mode derivation and intra prediction procedure based on an ISP intra prediction type.

FIG. 19 exemplarily illustrates the intra prediction mode derivation and intra prediction procedure based on an ISP intra prediction type.

Referring to FIG. 19, the decoding apparatus determines whether an ISP intra prediction is applied to the current block. For example, the decoding apparatus may acquire an ISP flag from the bitstream, and determine that the ISP intra prediction is applied if a value of the ISP flag is 1. Meanwhile, if the value of the ISP flag is 0, the decoding apparatus may determine that the ISP intra prediction is not applied.

If the ISP intra prediction is applied to the current block, the decoding apparatus may derive the intra prediction mode for the ISP intra prediction from the MPM list by parsing the MPM index from the bitstream. In this case, the decoding apparatus may directly parse the MPM index without having to parse the MPM flag. The decoding apparatus may generate a predicted block by performing the intra prediction based on the ISP intra prediction type and the intra prediction mode.

Meanwhile, if the ISP intra prediction is not applied to the current block, the decoding apparatus may parse the MPM flag to the bitstream, and derive the intra prediction mode for the normal intra prediction by parsing the MPM index if the value of the MPM flag is 1. Meanwhile, if the value of the MPM flag is 0, the decoding apparatus may parse the remaining intra mode information from the bitstream, and derive the intra prediction mode of the current block among the intra prediction modes other than the candidate intra prediction modes included in the MPM list based on the remaining intra mode information.

The decoding apparatus may generate a predicted block by performing the intra prediction based on the intra prediction mode.

The specific intra prediction type in which the signaling of the MPM flag is unnecessary may include the LIP, MRL intra prediction, and ISP intra prediction as described above.

Figure 20:
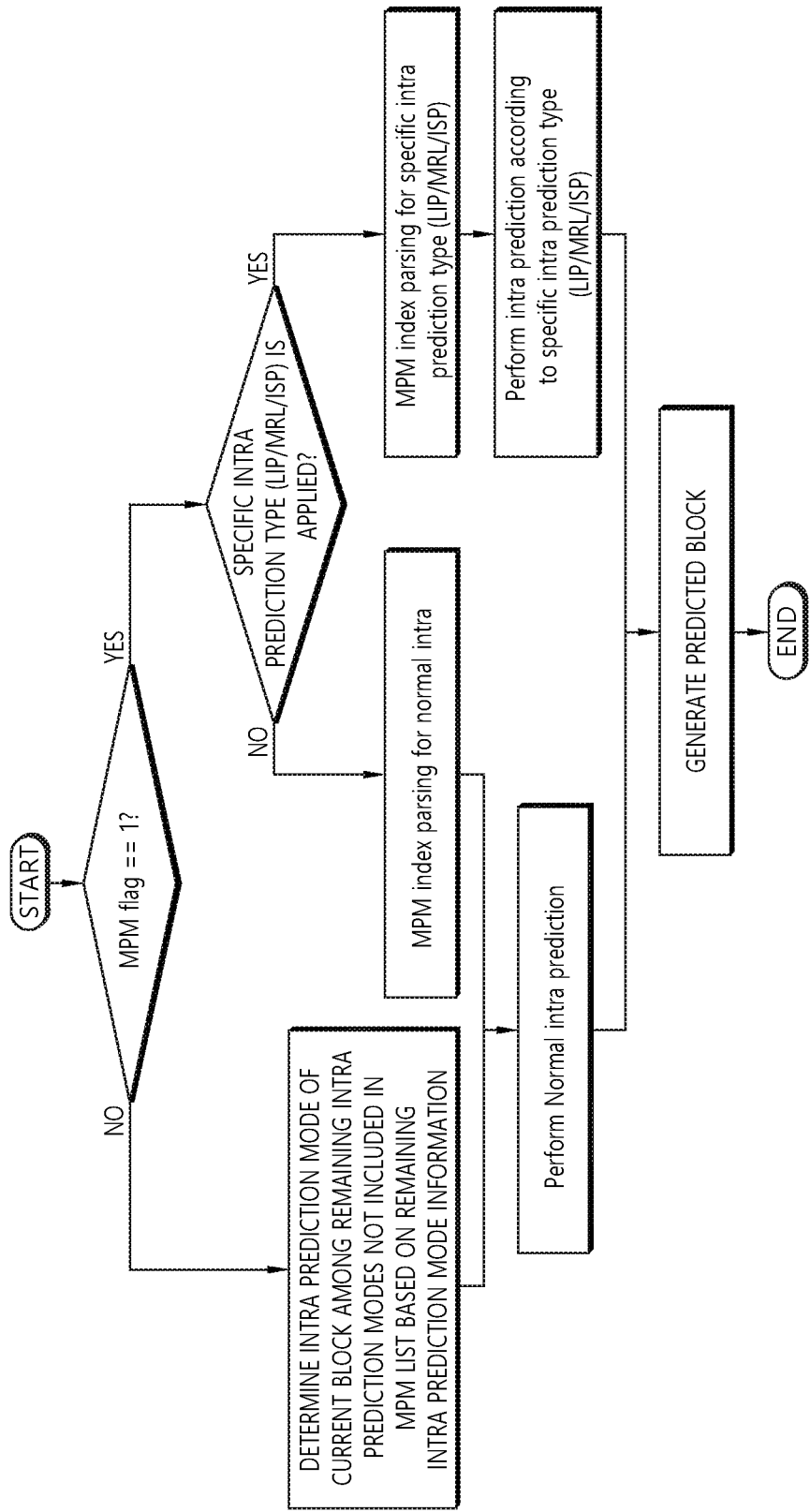
FIG. 20 illustrates a method for signaling an intra prediction mode according to another exemplary embodiment of the present disclosure.

As another example, as illustrated in FIG. 20, after the MPM flag is first parsed, whether the specific intra prediction type (LIP, MRL, ISP) is applied may also be confirmed according to whether the value of the MPM flag is 1. In this case, the MPM flag may be signaled to all intra blocks, but when the MPM is not applied to the current block (MPM flag off), whether the specific intra prediction type is applied is not considered, such that in this case, there is an advantage in that the information indicating the specific intra prediction type (e.g., the LIP flag, the MRL index, the ISP flag, or the like) may not be signaled/parsed.

Figure 21:
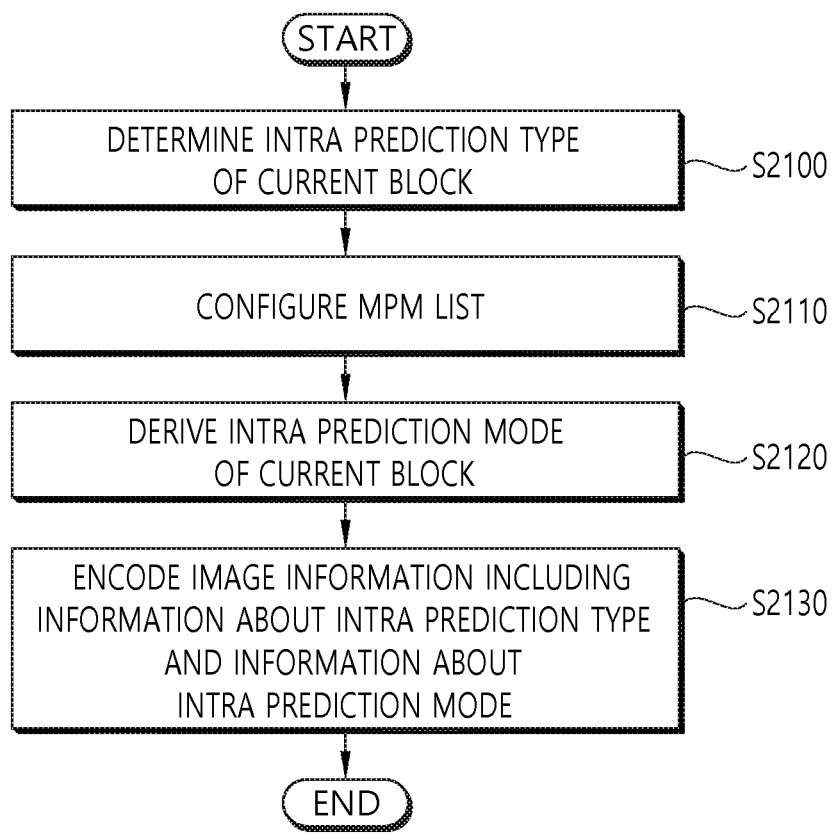
FIGS. 21 and 22 schematically illustrate an example of a video/image encoding method including the intra prediction method according to the exemplary embodiment of the present disclosure and related components.
Figure 22:
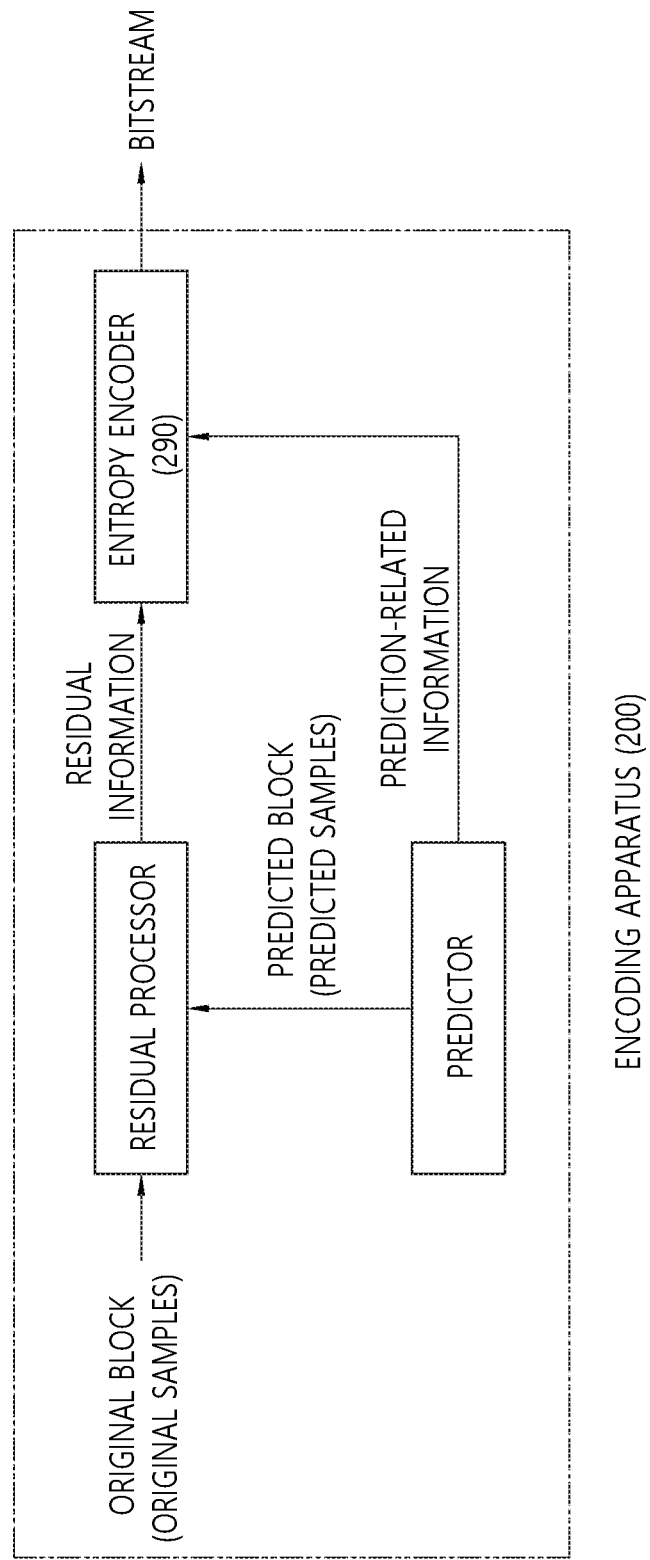

FIGS. 21 and 22 schematically illustrate an example of the video/image encoding method including the intra prediction method according to the exemplary embodiment of the present disclosure and related components. The method illustrated in FIG. 21 may be performed by the encoding apparatus illustrated in FIG. 2. Specifically, for example, S2100 to S2120 illustrated in FIG. 21 may be performed by the predictor (specifically, the intra predictor 285) of the encoding apparatus, and S2130 illustrated in FIG. 21 may be performed by the entropy encoder 290 of the encoding apparatus. The method illustrated in FIG. 21 may include the aforementioned exemplary embodiments in this document.

Referring to FIG. 21, the encoding apparatus determines an intra prediction type of a current block (S2100). The encoding apparatus may determine whether a specific intra prediction type in which the signaling of an MPM flag is unnecessary is applied to the current block. As described above, the specific intra prediction type may include at least one of the LIP, the MRL intra prediction, and the ISP intra prediction. Alternatively, the encoding apparatus may also determine whether a normal intra prediction type in which the signaling of the MPM flag is necessary is applied to the current block. The encoding apparatus may generate information about the intra prediction type of the current block.

The encoding apparatus configures an MPM list of the current block (S2110). The MPM list may be configured in various methods as described above in this document. The MPM list may be derived based on intra prediction modes of neighboring blocks of the current block and predetermined default modes. The MPM list may include (MPM) candidate intra prediction modes of the current block.

The encoding apparatus derives the intra prediction mode of the current block based on the MPM list (S2120). The encoding apparatus may derive an optimal intra prediction mode as the intra prediction mode of the current block based on RDO. The encoding apparatus may generate information about the intra prediction mode of the current block. Procedures of configuring the MPM list and deriving the intra prediction mode may include the aforementioned procedures in FIGS. 12 to 15 or the like. The encoding apparatus may derive the intra prediction mode based on the intra prediction type and generate the information about the intra prediction mode.

The encoding apparatus may encode image information including the information about the intra prediction type and the information about the intra prediction mode (S2130). The encoded image information may be output in a form of the bitstream. The bitstream may be transmitted to the decoding apparatus through a network or a storage medium. The prediction-related information may include the information about the intra prediction type and the information about the intra prediction mode. As described above, the information about the intra prediction type may include the LIP flag, the multi-reference line index, and/or the ISP flag. The information about the intra prediction mode may include at least one of the aforementioned MPM flag, MPM index, and remaining intra mode information. The image information may include the residual information, as described above. The residual information may represent (quantized) transform coefficients about the residual samples of the current block.

For example, if the intra prediction type represents the specific intra prediction type, a bit about the MPM flag may not be included in the bitstream.

For example, if the intra prediction type represents the normal intra prediction type, one or more bits for each of the MPM flag and the MPM index may be included in the bitstream.

For example, if the intra prediction type represents the specific intra prediction type, the encoding apparatus may search for the intra prediction mode of the current block only among the candidate intra prediction modes within the MPM list.

The specific intra prediction type may include at least one of the linear interpolation intra prediction (LIP) type, the multi-reference line (MRL) intra prediction type, or the intra sub-partitions (ISP) intra prediction type.

For example, the specific intra prediction type may include the LIP type, the information about the intra prediction type may include the LIP flag, and the value of the LIP flag, which is 1, may indicate that the LIP type is applied to the current block.

For example, the specific intra prediction type may include the MRL intra prediction type, the information about the intra prediction type may include the multi-reference line index (e.g., intra_luma_ref_idx), and the value of the multi-reference line index larger than 0 may indicate that the MRL intra prediction type is applied to the current block.

For example, the specific intra prediction type may include the ISP intra prediction type, the information about the intra prediction type may include the ISP flag, and the value of the ISP flag, which is 1, may indicate that the ISP intra prediction type is applied to the current block.

If the intra prediction type represents the specific intra prediction type, the intra prediction mode of the current block may be limited to one of the candidate intra prediction modes within the MPM list.

Figure 23:
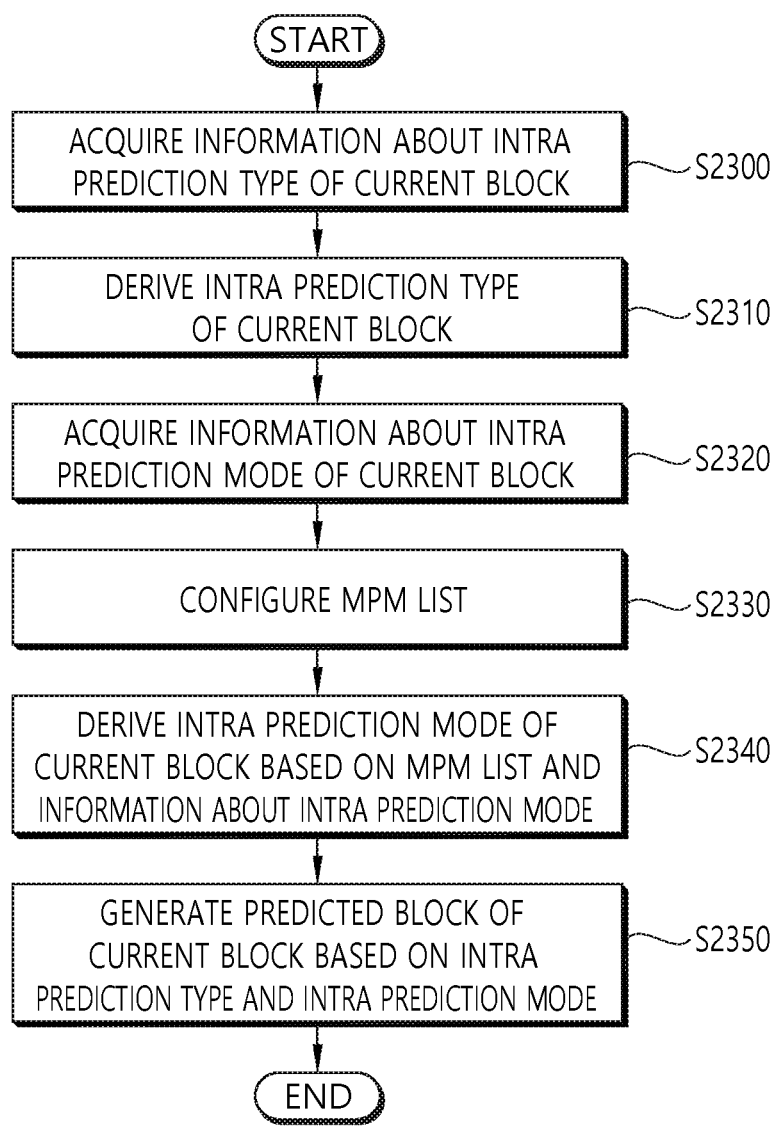
FIGS. 23 and 24 schematically illustrate an example of the intra prediction method according to the exemplary embodiment of the present disclosure and related components.
Figure 24:
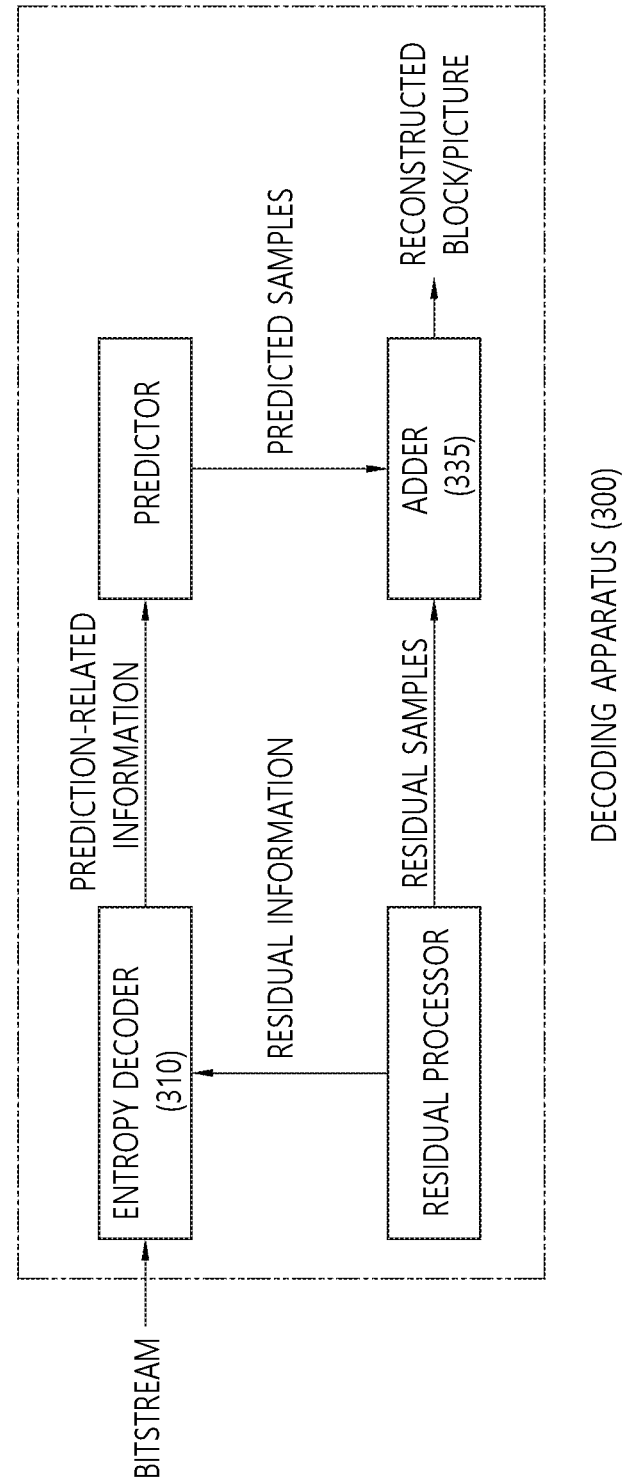

FIGS. 23 and 24 schematically illustrate an example of the intra prediction method according to the exemplary embodiment of the present disclosure and related components. The method illustrated in FIG. 23 may be performed by the decoding apparatus illustrated in FIG. 3. Specifically, for example, S2300 illustrated in FIG. 23 may be performed by the entropy decoder 310 of the decoding apparatus, and S2310 to S2350 illustrated in FIG. 23 may be performed by the predictor (specifically, the intra predictor 285) of the decoding apparatus. The method illustrated in FIG. 23 may include the aforementioned exemplary embodiments in this document.

Referring to FIG. 23, the decoding apparatus acquires information about an intra prediction type of a current block from a bitstream (S2300). As described above, the information about the intra prediction type may include the LIP flag, the multi-reference line index, and/or the ISP flag.

The decoding apparatus derives the intra prediction type of the current block based on the information about the intra prediction type (S2310).

The decoding apparatus acquires information about an intra prediction mode of the current block from the bitstream (S2320). The information about the intra prediction mode may include at least one of the aforementioned MPM flag, MPM index, and remaining intra mode information.

The decoding apparatus configures a most probable mode (MPM) list including candidate intra prediction modes of the current block based on neighboring blocks of the current block (S2330). The MPM list may be configured in various methods as described above in this document. The MPM list may be derived based on the intra prediction modes of the neighboring blocks of the current block and predetermined default modes. The MPM list may include (MPM) candidate intra prediction modes of the current block.

The decoding apparatus derives the intra prediction mode of the current block based on the MPM list and the information about the intra prediction mode (S2340).

The decoding apparatus generates a predicted block of the current block based on the intra prediction type and the intra prediction mode (S2350). The predicted block includes prediction samples of the current block. As described above, a reconstructed block/picture may be generated based on the predicted block. As described above, the decoding apparatus may acquire residual information from the bitstream, and the reconstructed block/picture may be generated further based on the residual information. Thereinafter, as necessary, in order to improve the subjective/objective image qualities, the in-loop filtering procedure such as a deblocking filter, a SAO, and/or ALF procedure may be applied to the reconstructed picture.

For example, if the intra prediction type represents the specific intra prediction type, the decoding apparatus may parse the MPM index without parsing the MPM flag from the bitstream. For example, if the intra prediction type represents the specific intra prediction type, a value of the MPM flag may be derived as 1 without parsing the MPM flag from the bitstream. As another example, if the intra prediction type represents the normal intra prediction type, the decoding apparatus may parse the MPM flag from the bitstream, and parse the MPM index if the value of the MPM flag is 1.

For example, the specific intra prediction type may include at least one of the linear interpolation intra prediction (LIP) type, the multi-reference line (MRL) intra prediction type, or the intra sub-partitions (ISP) intra prediction type.

For example, the specific intra prediction type may include the LIP type, the information about the intra prediction type may include the LIP flag, and if the value of the LIP flag is 1, the LIP type may be derived as the intra prediction type of the current block.

For example, the specific intra prediction type may include the MRL intra prediction type, the information about the intra prediction type may include the multi-reference line index, and if the value of the multi-reference line index is larger than 0, the MRL intra prediction type may be derived as the intra prediction type of the current block.

For example, the specific intra prediction type may include the ISP intra prediction type, the information about the intra prediction type may include the ISP flag, and if the value of the ISP flag is 1, the ISP intra prediction type may be derived as the intra prediction type of the current block.

For example, if the intra prediction type represents the specific intra prediction type, the intra prediction mode of the current block may be limited to one of the candidate intra prediction modes within the MPM list.

For example, if the intra prediction type represents the normal intra prediction type and the value of the MPM flag is 0, the information about the intra prediction mode may further include remaining intra mode information, and the intra prediction mode of the current block may be derived as one of the remaining intra prediction modes other than the candidate intra prediction modes within the MPM list based on the remaining intra mode information.

In the aforementioned exemplary embodiments, while the methods are described based on the flowcharts shown as a series of steps or blocks, the present disclosure is not limited to the order of steps, and a certain step may occur in different order from or simultaneously with a step different from that described above. In addition, those skilled in the art will understand that the steps illustrated in the flowchart are not exclusive, and other steps may be included or one or more steps in the flowcharts may be deleted without affecting the scope of the present disclosure.

The aforementioned method according to the present disclosure may be implemented in a software form, and the encoding apparatus and/or the decoding apparatus according to the present disclosure may be, for example, included in an apparatus for performing the image processing, such as a TV, a computer, a smart phone, a set top box, or a display apparatus.

When the exemplary embodiments of the present disclosure are implemented in software, the aforementioned method may be implemented by modules (processes, functions, and so on) for performing the aforementioned functions. Such modules may be stored in a memory and executed by a processor. The memory may be internal or external to the processor, and the memory may be coupled to the processor using various well known means. The processor may include an application-specific integrated circuit (ASIC), other chipsets, a logic circuit, and/or a data processing device. The memory may include a read-only memory (ROM), a random access memory (RAM), a flash memory, a memory card, a storage medium, and/or other storage device. That is, the exemplary embodiments described in the present disclosure may be implemented and performed on a processor, a microprocessor, a controller, or a chip. For example, the functional units illustrated in each drawing may be implemented and performed on a computer, a processor, a microprocessor, a controller, or a chip.

In addition, the decoding apparatus and encoding apparatus to which the present document is applied may be included in a multimedia broadcasting transmitting and receiving device, a mobile communication terminal, a home cinema video device, a digital cinema video device, a surveillance camera, a video chat device, a real time communication device such as video communication, a mobile streaming device, a storage medium, a camcorder, a Video on Demand (VoD) service provider, an Over the top video (OTT) device, an Internet streaming service provider, a 3D video device, a video telephony video device, a medical video device, or the like, and may be used to process video signals or data signals. For example, the Over the top video (OTT) device may include a game console, a Blu-ray player, an Internet access TV, a home theater system, a smartphone, a tablet PC, a digital video recorder (DVR), and the like.

In addition, the processing method to which the present disclosure is applied may be produced in the form of a program executed by a computer, and may be stored in a computer-readable recording medium. Multimedia data having a data structure according to the present disclosure may also be stored in the computer-readable recording medium. The computer-readable recording medium includes all kinds of storage devices and distributed storage devices in which computer-readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. In addition, the computer-readable recording medium also includes media implemented in the form of a carrier wave (e.g., transmission over the Internet). In addition, the bitstream generated by the encoding method may be stored in the computer-readable recording medium or transmitted through a wired and wireless communication network. In addition, the exemplary embodiment of the present disclosure may be implemented by a computer program product by a program code, and the program code may be performed in a computer by the exemplary embodiment of the present disclosure. The program code may be stored on a computer-readable carrier.

In addition, the contents streaming system to which the present disclosure is applied may largely include an encoding server, a streaming server, a web server, a media storage, a user device, and a multimedia input device.

The encoding server performs the role of generating a bitstream by compressing contents input from multimedia input devices such as a smartphone, a camera, and a camcorder into digital data and transmitting the generated bitstream to the streaming server. As another example, if multimedia input devices such as a smartphone, a camera, and a camcorder directly produce a bitstream, the encoding server may be omitted. The bitstream may be generated by an encoding method or a method for generating a bitstream to which the present disclosure is applied, and the streaming server may temporarily store the bitstream while the bitstream is transmitted or received.

The streaming server performs the role of transmitting multimedia data to a user device based on a user request through a web server, and the web server performs the role of a medium informing the user of which services are available. If the user requests a desired service from the web server, the web server transfers the request to the streaming server, and the streaming server transmits multimedia data to the user. At this time, the contents streaming system may include a separate control server, and in this case, the control server performs the role of controlling commands/responses between devices within the contents streaming system.

The streaming server may receive contents from a media storage and/or an encoding server. For example, if contents are received from the encoding server, the contents may be received in real-time. In this case, to provide a smooth streaming service, the streaming server may store the bitstream for a predetermined time.

Examples of the user device may include a mobile phone, a smartphone, a laptop computer, a digital broadcast terminal, a personal digital assistant (PDA), a portable multimedia player (PMP), a navigation terminal, a slate PC, a tablet PC, an ultra-book, a wearable device (e.g., a smart watch or a smart glass), head mounted display (HMD), a digital TV, a desktop computer, a digital signage, or the like. Each individual server within the contents streaming system may be operated as a distributed server, and in this case, data received by each server may be processed in a distributed manner.

What is claimed is:

1. An image decoding method performed by a decoding apparatus comprising:
   receiving information about an intra prediction type of a current block through a bitstream;
   deriving the intra prediction type of the current block as a specific intra prediction type based on the information about the intra prediction type;
   acquiring information about an intra prediction mode of the current block from the bitstream;
   configuring a most probable mode (MPM) list comprising candidate intra prediction modes of the current block based on neighboring blocks of the current block;
   deriving the intra prediction mode of the current block based on the MPM list and the information about the intra prediction mode;
   generating a predicted block of the current block by performing intra prediction based on the specific intra prediction type and the derived intra prediction mode;
   acquiring residual information from the bitstream;
   generating a residual block based on the residual information; and
   generating a reconstructed block configuring a reconstructed picture based on the residual block and the predicted block derived based on the specific intra prediction type and the derived intra prediction mode,
   wherein for the specific intra prediction type, the intra prediction is performed based on neighboring reference samples in a specific sample line which is not adjacent to a top boundary and a left boundary of the current block,
   wherein, based on the intra prediction type representing the specific intra prediction type, the information about the intra prediction mode comprises MPM index information,
   wherein based on the intra prediction type representing the specific intra prediction type, the MPM index information is parsed without parsing an MPM flag information from the bitstream, and
   wherein, for generating the predicted block based on the specific intra prediction type and the derived intra prediction mode, neighboring reference samples used based on a height of the current block being greater than a width of the current block are different from neighboring reference samples used based on the width of the current block being greater than the height of the current block.

2. The image decoding method of claim 1, wherein based on the intra prediction type representing a normal intra prediction type rather than the specific intra prediction type, the information about the intra prediction mode comprises the MPM flag information and the MPM index information.

3. The image decoding method of claim 1, wherein based on the intra prediction type representing the specific intra prediction type, a value of the MPM flag information is derived as 1 without parsing the MPM flag information from the bitstream.

4. The image decoding method of claim 2, wherein based on the intra prediction type representing the normal intra prediction type, the MPM flag information is parsed from the bitstream, and based on a value of the MPM flag information being equal to 1, the MPM index information is parsed.

5. The image decoding method of claim 1, wherein the specific intra prediction type comprises: a linear interpolation intra prediction (LIP) type.

6. The image decoding method of claim 5, wherein the information about the intra prediction type comprises: a LIP flag information, and
   wherein based on a value of the LIP flag information being equal to 1, the LIP type is derived as the intra prediction type of the current block.

7. The image decoding method of claim 1, wherein based on the intra prediction type representing the specific intra prediction type, the intra prediction mode of the current block is limited to one of candidate intra prediction modes within the MPM list.

8. The image decoding method of claim 1, wherein based on the intra prediction type representing the normal intra prediction type and a value of the MPM flag information being equal to 0,
   the information about the intra prediction mode further comprises: remaining intra mode information, and the intra prediction mode of the current block is derived as one of remaining intra prediction modes other than candidate intra prediction modes within the MPM list based on the remaining intra mode information.

9. An image encoding method performed by an image encoding apparatus comprising:

determining an intra prediction type of a current block as a specific intra prediction type;

generating information about the intra prediction type of the current block;

configuring a most probable mode (MPM) list comprising candidate intra prediction modes of the current block based on neighboring blocks of the current block;

deriving an intra prediction mode of the current block based on the MPM list;

generating a predicted block of the current block by performing intra prediction based on the specific intra prediction type and the derived intra prediction mode;

generating predicted information of the current block, the predicted information comprising the information about the intra prediction type and the information about the intra prediction mode;

deriving a residual block based on the predicted block;

generating residual information based on the residual block; and outputting a bitstream by encoding image information comprising the predicted information and the residual information, wherein the information about the intra prediction mode is generated based on the intra prediction type, wherein based on the intra prediction type representing the specific intra prediction type, the information about the intra prediction mode comprises: an MPM index information, wherein for the specific intra prediction type, the intra prediction is performed based on neighboring reference samples in a specific sample line which is not adjacent to a top boundary and a left boundary of the current block, wherein based on the intra prediction type representing the specific intra prediction type, the MPM index information is configured to be parsed without parsing an MPM flag information from the bitstream, and wherein, for generating the predicted block based on the specific intra prediction type and the derived intra prediction mode, neighboring reference samples used based on a height of the current block being greater than a width of the current block are different from neighboring reference samples used based on the width of the current block being greater than the height of the current block.

10. The image encoding method of claim 9, wherein based on the intra prediction type representing a normal intra prediction type rather than the specific intra prediction type, the information about the intra prediction mode comprises: the MPM flag information and the MPM index information.

11. The image encoding method of claim 9, wherein based on the intra prediction type representing the normal intra prediction type, one or more bits for each of the MPM flag information and the MPM index information are comprised in the bitstream.

12. The image encoding method of claim 9, wherein based on the intra prediction type representing the specific intra prediction type, the intra prediction mode of the current block is searched only among the candidate intra prediction modes within the MPM list.

13. The image encoding method of claim 9, wherein the specific intra prediction type comprises: a linear interpolation intra prediction (LIP) type.

14. The image encoding method of claim 13, wherein the information about the intra prediction type comprises: an LIP flag information, and wherein based on a value of the LIP flag information being equal to 1, the LIP type is applied to the current block.

15. The image encoding method of claim 9, wherein based on the intra prediction type representing the specific intra prediction type, a bit for the MPM flag information of the current block is not comprised in the bitstream.

16. A non-transitory computer-readable storage medium storing a bitstream generated by a method, the method comprising:

determining an intra prediction type of a current block as a specific intra prediction type;

generating information about the intra prediction type of the current block;

configuring a most probable mode (MPM) list comprising candidate intra prediction modes of the current block based on neighboring blocks of the current block;

deriving an intra prediction mode of the current block based on the MPM list;

generating a predicted block of the current block by performing intra prediction based on the specific intra prediction type and the derived intra prediction mode;

generating predicted information of the current block, the predicted information comprising the information about the intra prediction type and the information about the intra prediction mode;

deriving a residual block based on the predicted block;

generating residual information based on the residual block; and generating the bitstream by encoding image information comprising the predicted information and the residual information, wherein the information about the intra prediction mode is generated based on the intra prediction type, wherein based on the intra prediction type representing the specific intra prediction type, the information about the intra prediction mode comprises: an MPM index information, wherein for the specific intra prediction type, the intra prediction is performed based on neighboring reference samples in a specific sample line which is not adjacent to a top boundary and a left boundary of the current block, wherein based on the intra prediction type representing the specific intra prediction type, the MPM index information is configured to be parsed without parsing an MPM flag information from the bitstream, and wherein, for generating the predicted block based on the specific intra prediction type and the derived intra prediction mode, neighboring reference samples used based on a height of the current block being greater than a width of the current block are different from neighboring reference samples used based on the width of the current block being greater than the height of the current block.

* * * * *